United States Patent [19]
Yamauchi

[11] Patent Number: 6,055,276
[45] Date of Patent: Apr. 25, 2000

[54] SIGNAL TRANSMITTING CIRCUIT AND METHOD WITH SELECTION AMONG DIFFERENTIAL PAIRS

[75] Inventor: Hiroyuki Yamauchi, Osaka, Japan

[73] Assignee: Matsushita Electric Industrial Co., Ltd., Osaka, Japan

[21] Appl. No.: 08/538,858

[22] Filed: Oct. 4, 1995

[30] Foreign Application Priority Data

Jul. 17, 1995 [JP] Japan ..................................... 7-180063

[51] Int. Cl.$^7$ ...................................................... H04B 3/02
[52] U.S. Cl. .......................................... 375/257; 375/295
[58] Field of Search ..................................... 375/257, 295, 375/258, 259, 288; 370/297, 273, 366; 340/825, 825.03, 825.42, 825.59, 825.6, 825.62, 825.7; 365/207, 208, 189.02, 156; 307/65, 75, 80, 84, 87; 341/101; 395/891

[56] References Cited

FOREIGN PATENT DOCUMENTS 4-283813  10/1992  Japan .

*Primary Examiner*—William Luther
*Attorney, Agent, or Firm*—McDermott, Will & Emery

[57] ABSTRACT

In the early half of one period of a main clock, one multiplexer selects a signal Ain, while the other multiplexer selects an inverted signal /Ain. Consequently, the signal Ain is transmitted to a signal line assigned to the signal line Ain, while the signal /Ain is transmitted to a signal line assigned to a signal Bin, thereby accomplishing differential transmission of the signal Ain. In the late half of one period of the main clock, the above one multiplexer selects an inverted signal /Bin, while the above other multiplexer selects the signal Bin. Consequently, the inverted signal /Bin is transmitted to the signal line assigned to the signal Ain, while the signal Bin is transmitted to the signal line assigned to the signal Bin, thereby accomplishing differential transmission of the signal Bin. Since differential transmission is thus accomplished with no increase in the number of wires, power saving can be achieved by data transfer with a small amplitude.

59 Claims, 32 Drawing Sheets

Fig.13(b) FIFTH VARIATION

SIGNAL TRANSMITTING CIRCUIT AND METHOD WITH SELECTION AMONG DIFFERENTIAL PAIRS

BACKGROUND OF THE INVENTION

The present invention relates to a signal transmitting circuit and method. More particularly, it relates to an improved signal transmitting circuit and method for use in a memory circuit or microprocessor which transmits in parallel a large number of signals in synchronization with a given clock inside one semiconductor chip or between two semiconductor chips.

Conventional microprocessors or memory circuits for processing signals in parallel, such as an image memory, a synchronous dynamic random-access memory (SDRAM), and a static random-access memory (SRAM), have adopted the following basic structure for driving signal lines, i.e., for transmitting signals.

FIG. 24 illustrates the basic structure, in which are shown: signal lines 100 and 101 each composed of a single wire; drivers 102 and 103 each composed of, e.g., an inverter for transmitting signals to the above respective signal lines; and receivers 104 and 105 each composed of, e.g., an inverter for receiving signals from the respective signal lines.

A description will be given to the operation of the above conventional structure with reference to FIG. 25. In the case of transmitting parallel signals in synchronization with a clock MCLK, an input is latched on the rising edge or falling edge (rising edge in FIG. 25) of the above clock MCLK, while the drivers 102 and 103 are simultaneously activated to drive the respective signals 100 and 101. The signals on the above respective signal lines 100 and 101 are latched into the inputs of the respective receivers 104 and 105 on the rising edge or falling edge (rising edge in the drawing) of the clock MCLK, while the receivers 104 and 105 are simultaneously activated, thereby detecting the signals on the signal lines.

In the above conventional structure, however, since each of the signal lines 100 and 101 is composed of a single wire, information as a signal on the signal line is represented by a potential difference between the potential of each of the signal lines after a level shift and the reference threshold voltage of the corresponding receiver for discerning a signal. Consequently, the potential amplitude of each of the signal lines should be sufficiently large, in consideration of power-source noise or the like, so that a large amount of power is consumed to transmit signals. In addition, the signal transmission is greatly influenced by a wiring delay determined by the product of the wiring capacitance of each of the signal lines and the resistance thereof. Hence, the above conventional structure has the disadvantageous of high power consumption, in spite of its low-speed operation.

To eliminate the disadvantage, there has been adopted a conventional structure in which other signal lines equal in number to the signal lines 100 and 101 are provided to perform differential signal transmission, whereby signals on the respective signal lines are differentially transmitted between the respective signal lines and the corresponding other signal lines.

However, although it is possible to achieve power saving since the potential amplitude of each of the signal lines can be reduced in the structure, the number of signal lines is increased, so that when the number of parallel bits is increased to, e.g., "64" or "128" in an image memory or the like, the chip area and cost are increased disadvantageously. Therefore, the structure is not applicable to a circuit aimed at miniaturization and low cost.

SUMMARY OF THE INVENTION

An object of the present invention is to provide a miniaturized signal transmitting circuit which accomplishes, by wire sharing, differential transmission of signals with no increase in the number of signal lines, thereby achieving low-cost power saving by transmission with a small amplitude and to provide a signal transmitting method using the signal transmitting circuit.

To attain the above object, the present invention has grouped a plurality of signal lines in pairs such that two signals corresponding to the two signal lines in each pair are not transmitted at the same time. Instead, one of the two signals is transmitted in the early half of one period of a clock, while the other of the two signals is transmitted in the late half of the clock. In transmitting the one of the two signals in the early half of one period of the clock, the signal is differentially transmitted by the above two signal lines forming a pair. Similarly, in transmitting the other of the two signals in the late half of the clock, the signal is differentially transmitted by the above two signals forming a pair.

Specifically, the signal transmitting circuit of the present invention is for transmitting first and second signals to be transmitted by means of first and second signal lines, which comprises: a first signal generating means for generating a first nonconcurrence signal which is not concurrent with the above first signal; a second signal generating means for generating a second nonconcurrence signal which is not concurrent with the above second signal; and a selecting means for receiving the above first and second signals and the first and second nonconcurrence signals generated by the above first and second signal generating means, selecting either a pair of the above first signal and first nonconcurrence signal or a pair of the above second signal and second nonconcurrence signal, and transmitting the two signals forming the selected pair as a differential signal to the above first and second signal lines.

The signal transmitting method of the present invention is of transmitting first and second signals to be transmitted by means of first and second signal lines, which comprises the steps of: receiving the above first and second signals; generating a nonconcurrence signal which is not concurrent with the above first signal and transmitting, as a differential signal, the nonconcurrence signal and the above first signal to the above first and second signal lines; and generating another nonconcurrence signal which is not concurrent with the above second signal and transmitting, as a differential signal, the nonconcurrence signal and the above second signal to the above first and second signal lines.

Moreover, in alternately transmitting the pair of the first signal and nonconcurrence signal thereof and the pair of the second signal and nonconcurrence signal thereof in the above signal transmitting method of the present invention, the first signal and the nonconcurrence signal thereof are transmitted in an early half of one period of a clock and the second signal and the nonconcurrence signal thereof are transmitted in a late half of one period of the above clock.

With the above structure, in transmitting two different signals by means of two signal lines in the present invention, one of the two signals is differentially transmitted by the two signal lines and then the other of the two signals is differentially transmitted by the above two signal lines. As a result, differential transmission is accomplished without actually increasing the number of the signal lines, thereby effectively reducing the area of an image memory and the area of a signal transmitting system for performing parallel signal processing, which is positioned between two microprocessors.

Moreover, since a first signal is differentially transmitted in the early half of one period of the clock and a second signal is differentially transmitted in the late half of one period of the clock in the present invention, the same transfer rate as obtained in the case of simultaneously transmitting the two signals in one clock can surely be obtained.

The above objects and novel features of the present invention will be more apparent from the reading of the following description in conjunction with the accompanying drawings.

BRIEF DESCRIPTION OF THE DRAWINGS

The accompanying drawings show the preferred embodiments of the present invention.

In the drawings:

FIG. 13($b$) is a view showing the waveforms of respective signals on two signal lines in the fifth variation of the present invention;

FIG. 32($b$) is a view showing the effect of reducing a wiring area of signal lines under the conditions shown in FIG. 32($a$) according to the present invention.

DETAILED DESCRIPTION OF THE INVENTION

Below, the preferred embodiments of the present invention will be described with reference to the accompanying drawings.

(First Embodiment)

Figure 1:
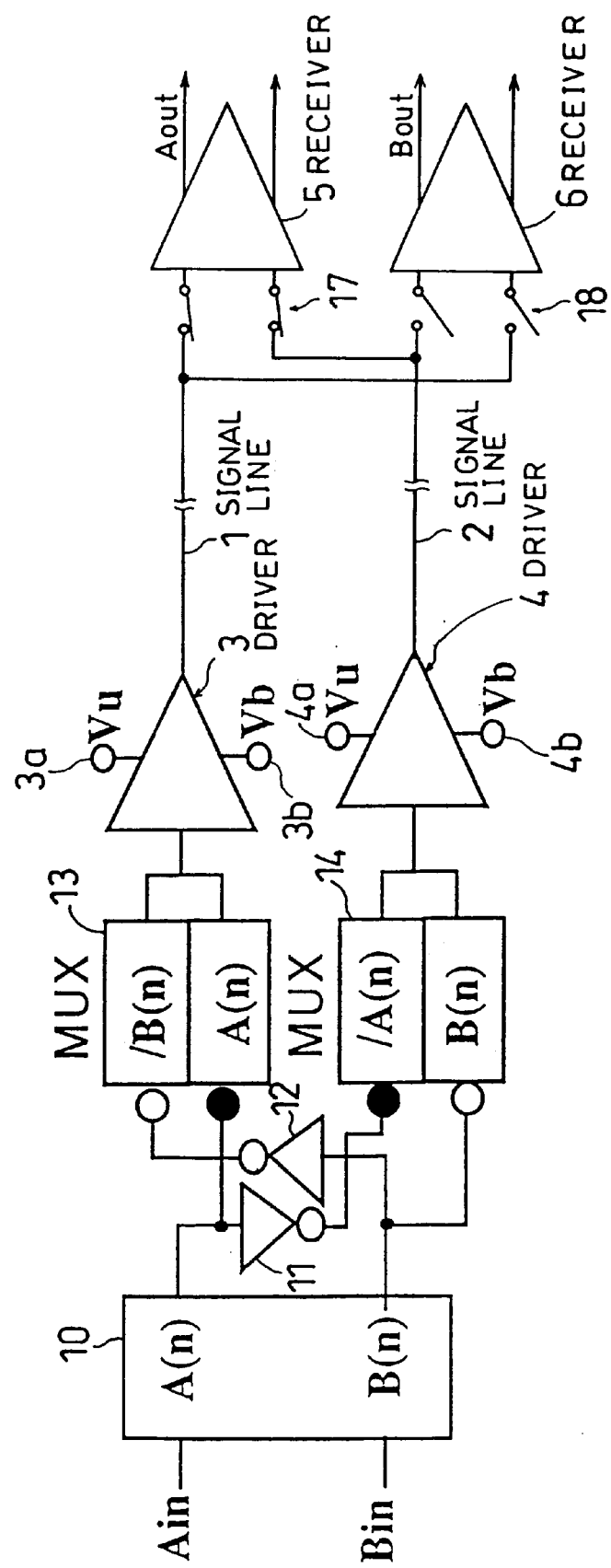
FIG. 1 is a circuit diagram showing a first embodiment of the present invention.

FIG. 1 is a conceptual view of a signal transmitting circuit according to a first embodiment of the present invention. In the drawing are shown: a first signal Ain to be transmitted; a second signal Bin to be transmitted; a first signal line 1; and a second signal line 2, which constitute a unit group for differentially transmitting signals. There are also shown: a first driver 3 of 1-input/1-output type for driving the above signal line 1; a second driver 4 of 1-input/1-output type for driving the above signal line 2; first and second receivers (signal receiving circuits) 5 and 6 of differential-input/differential-output type for latching, detecting, and amplifying respective signals on the above signal lines 1 and 2.

There are also shown: a buffer 10 for detecting the level ("H," "L") of each of the signals Ain, Bin corresponding to the above respective signal lines 1 and 2; an inverter (first signal generating circuit) 11; an inverter (second signal generating circuit) 12; a multiplexer (first selecting means) 13; and a multiplexer (second selecting means) 14.

The one multiplexer 13 receives the signal Ain and an inverted signal /Bin (second nonconcurrence signal which is not concurrent with the second signal Bin) from the inverter 12, while the other multiplexer 14 receives the signal Bin and an inverted signal /Ain (first nonconcurrence signal which is not concurrent with the first signal Ain) from the inverter 11. On the rising edge of a main clock MCLK, the one multiplexer 13 selects and outputs the signal Ain, while the multiplexer 14 selects and outputs the inverted signal /Ain thereof. On the falling edge of the main clock MCLK, the multiplexer 14 selects and outputs the signal Bin, while the multiplexer 13 selects and outputs the inverted signal /Bin thereof.

The above drivers 3 and 4 have first supply terminals 3a and 4a to each of which a first potential Vu is supplied and second supply terminals 3b and 4b to each of which a second potential Vb lower than the above first potential Vu (Vb<Vu) is supplied, respectively. When the signals from the corresponding multiplexers 13 and 14 are on the "H" level, the drivers 3 and 4 output signals each having the higher potential Vu. When the signals from the corresponding multiplexers 13 and 14 are on the "L" level, the drivers 3 and 4 output signals each having the lower potential Vb. The respective output amplitude voltages Vu–Vb of the drivers 3 and 4 are set lower than a power-source voltage. The drivers 3 and 4 constitute a voltage control means for controlling the respective amplitude voltages of the first and second signal lines 1 and 2 such that they have the small value (Vu–Vb) lower than the power-source voltage Vcc.

Each of the above receivers 5 and 6 is of differential-input/differential-output type and connected to the above two signal lines 1 and 2. In the stages previous to the receivers 5 and 6 are positioned respective switches 17 and 18. The switch 17 is operated by the main clock MCLK as a control signal and is closed when the main clock MCLK is on the "H" level. On the other hand, the switch 18 is operated by an inverted signal /MCLK of the main clock MCLK as a control signal and is closed when the main clock MCLK is on the "L" level. As a result, the receivers 5 and 6 alternately receive respective signals from the two signal lines 1 and 2 and perform output operations by interleaving. The receivers 5 and 6 have the same internal structure, which is shown in detail with reference to the receiver 5 in FIG. 2. When the power-source voltage Vcc is applied to the receiver 5, the receiver 5 is connected to the ground (indicated by a mark ▽ in the drawing). The receiver 5 has a voltage-to-current converting circuit 5a and a flip-flop circuit 5b so as to level-shift the potential difference between the above two signal lines 1 and 2 to the power-source voltage Vcc or to the ground voltage Vss. In the receiver 5, reference numerals 5c and 5d designate switches which are closed by the inverted signal /MCLK of the main clock so as precharge two differential output lines Aout when the signals have not been inputted from the two signal lines 1 and 2.

Below, a description will be given to the operation of the present embodiment with reference to the timing charts of FIGS. 3 and 4.

Figure 3:
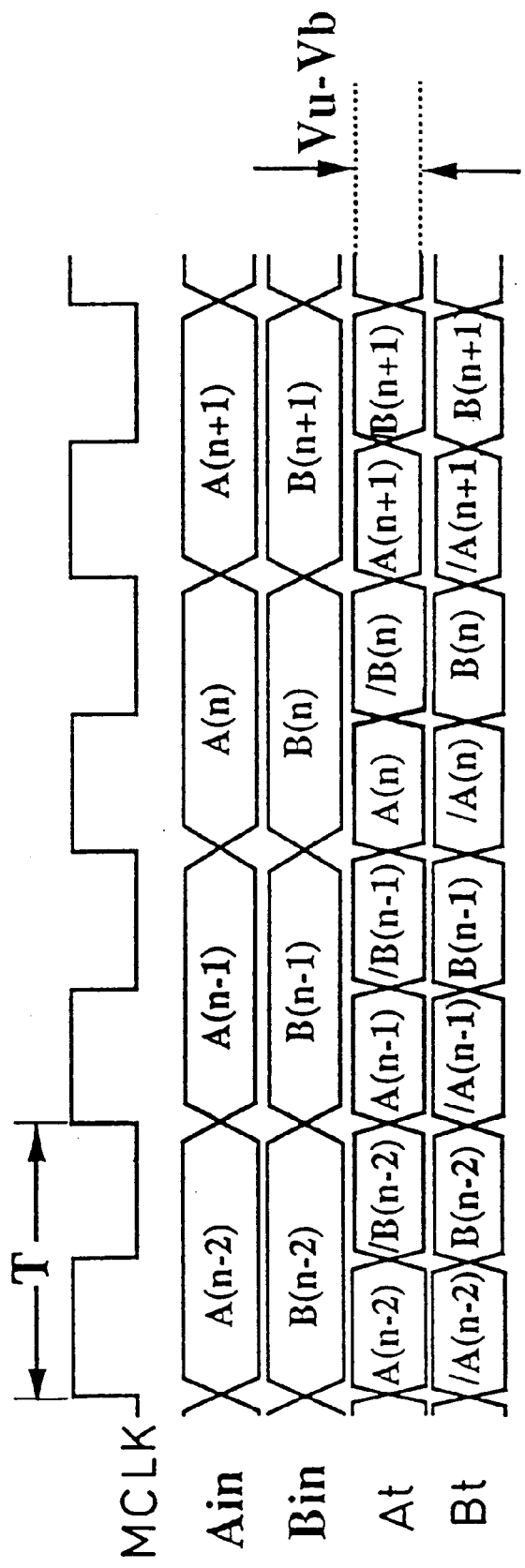
FIG. 3 is an operational timing chart of a signal transmitting circuit of the first embodiment of the present invention.

In FIG. 3, when the signal Ain is latched on the rising edge of the main clock MCLK, the one multiplexer 13 outputs the signal Ain, while the other multiplexer 14 outputs the inverted signal /Ain thereof. On the other hand, when the signal Bin is latched on the falling edge of the main clock MCLK, the one multiplexer 13 outputs the inverted signal /Bin thereof, while the multiplexer 14 outputs the signal /Bin. Consequently, in the early half of one period of the main clock MCLK, a signal At equal to the signal Ain is transmitted to the signal line 1 assigned to the signal Ain, while a signal Bt equal to the inverted signal /Ain is transmitted to the signal line 2. In the late half of one period of the main clock MCLK, the signal Bt equal to the signal Bin is transmitted to the signal line 2 assigned to the signal Bin, while the signal At equal to the inverted signal /Bin thereof is transmitted to the signal line 1. Here, the potential difference between the signals At and Bt on the pair of signal lines 1 and 2 equals the output amplitude voltage Vu–Vb of the above drivers 3 and 4, which is smaller than the power-source voltage Vcc.

Figure 4:
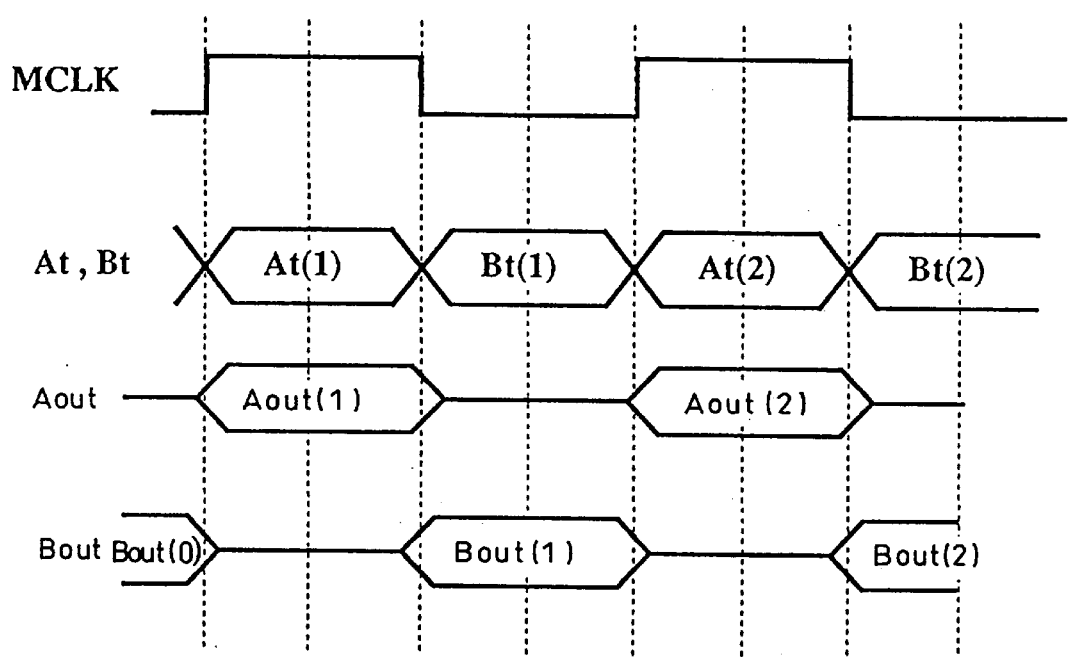
FIG. 4 is an operational timing chart of a signal receiving circuit of the first embodiment of the present invention.

On the other hand, as shown in FIG. 4, the receiver 5 latches, as a differential signal, the signals on the signal lines 1 and 2 on the rising edge of the main clock MCLK, amplifies the potential difference Vu–Vb between the signals such that it becomes the potential difference Vcc–Vss between the power-source voltage Vcc and the ground voltage Vss, and outputs the amplified signal as the differential signal Aout. On the falling edge of the main clock MCLK, as shown in FIG. 4, the receiver 6 latches the signals on the signal lines 1 and 2 as a differential signal, amplifies the potential difference Vu–Vb between the signals such that it becomes the potential difference Vcc–Vss between the power-source voltage Vcc and the ground voltage Vss, and outputs the amplified signal as a differential signal Bout.

Here, the output amplitude voltages of the drivers 3 and 4 are determined by the potential difference Vu–Vb between the two different voltages, so that the amplitudes of the signals At and Bt on the respective signal lines 1 and 2 are small since they correspond to a potential difference smaller than the power-source voltage Vcc. In transmitting the signal At via the signal line 1, however, information electrically different from the signal At (i.e., an inverted signal /At in the present embodiment) is invariably transmitted to the signal line 2, so that the receiver 5 differentially detects the signals At, /At on the two signal lines 1 and 2. As a result, a sufficiently large noise margin is surely obtained despite the small amplitude so that the signal At is reliably detected by the receiver 5. The same shall apply to the reception of the signal Bt.

Since the receivers 5 and 6 operate in synchronization with the main clock MCLK and need not operate at double the speed of the main clock MCLK, stable and highly sensitive operation can be performed.

Instead of providing the two receivers in parallel with the pair of signal lines 1 and 2 as in the present embodiment, it is also possible to provide only one receiver.

First Variation

Figure 5:
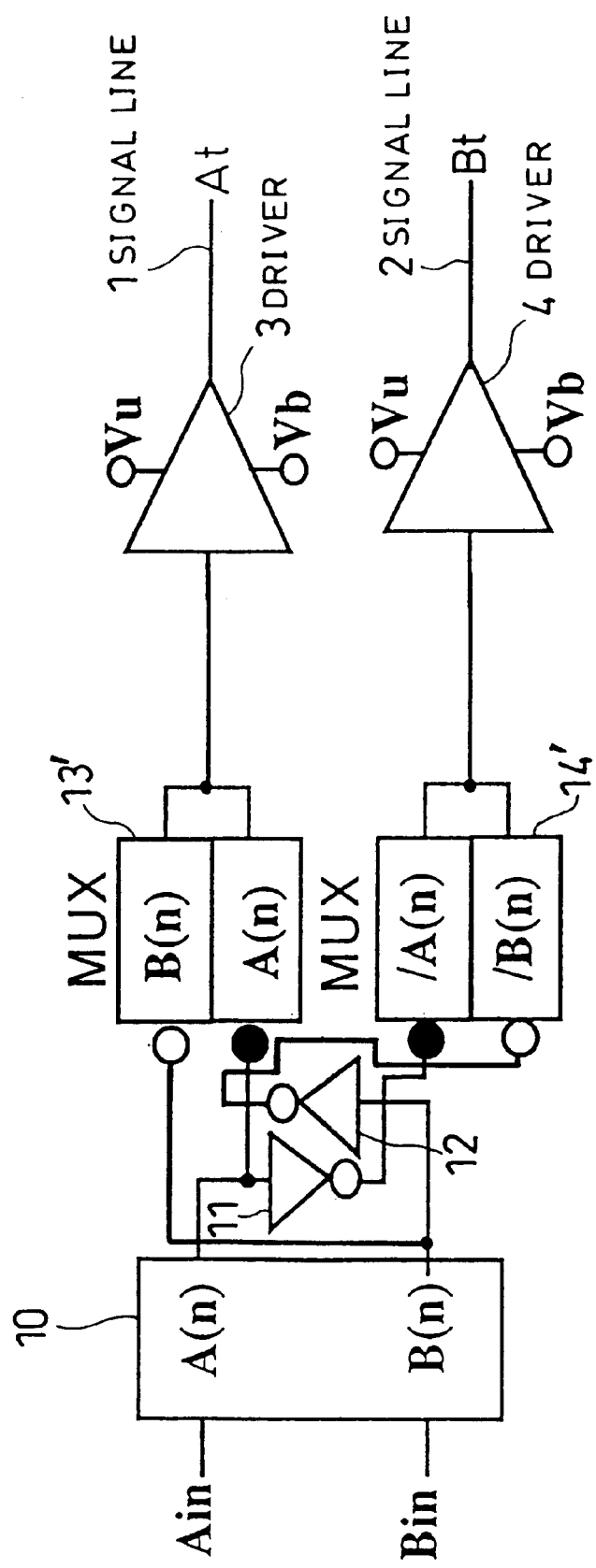
FIG. 5 is a circuit diagram showing a first variation of the present invention.

FIG. 5 shows a first variation of a signal transmitting circuit. In the present variation, one multiplexer (first selecting means) 13' receives the signals Ain, Bin from the buffer 10, while the other multiplexer (second selecting means) 14' receives the inverted signal /Ain from the inverter 11 and the inverted signal /Bin from the inverter 12. When the one multiplexer 13' selects the signal Ain, the other multiplexer 14' selects the inverted signal /Ain thereof. When the one multiplexer 13' selects the signal Bin, the other multiplexer 14' selects the inverted signal /Bin thereof.

Figure 6:
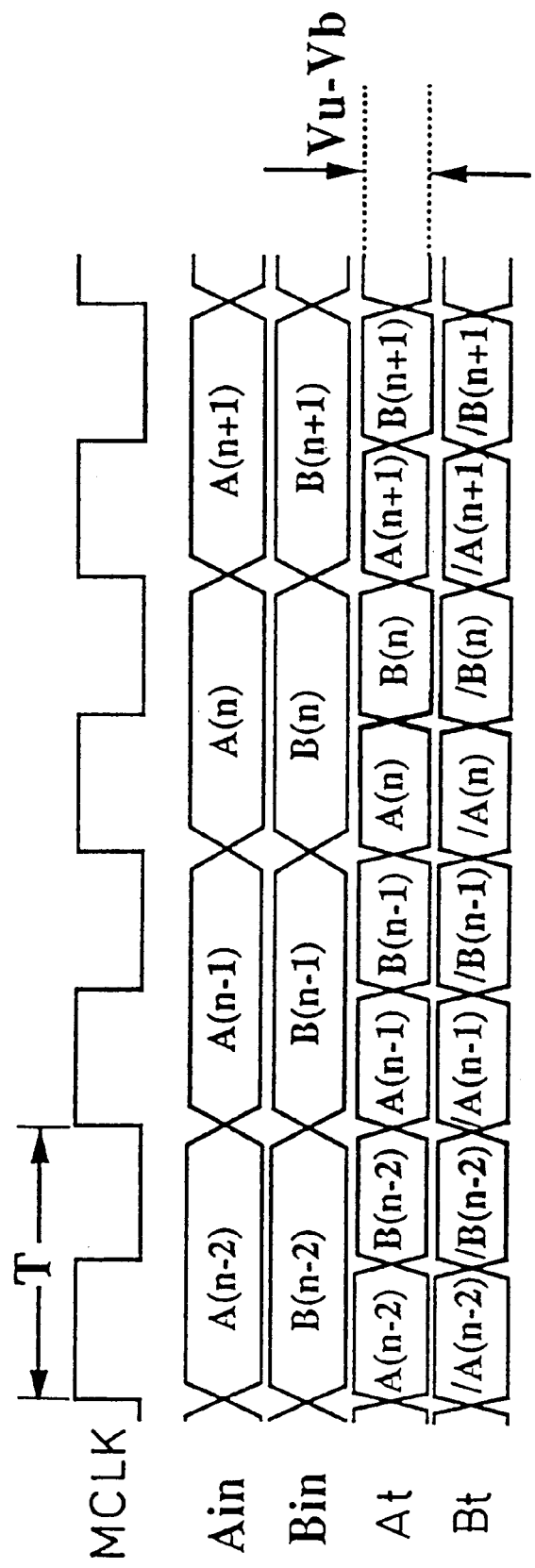
FIG. 6 is an operational timing chart of the first variation of the present invention.

FIG. 6 is an operational timing chart of the present variation. As can be seen from the drawing, the present variation is similar to the above first embodiment in that the signal Ain is latched on the rising edge of the main clock MCLK and the signal Bin is latched on the falling edge of the main clock MCLK. The present variation is different from the above first embodiment in that, e.g., the signal Ain or Bin is constantly outputted from the buffer 10 to the signal line 1 assigned to the signal Ain and the inverted signal /Ain or /Bin (information different from the signals Ain, Bin) is constantly outputted from the inverters 11, 12 onto the signal line 2 assigned to the signal Bin.

The differences between the respective effects of the present variation and the above first embodiment basically depend on data represented by the signals Ain, Bin, which is to be transmitted. Specifically, in the case where the two signals Ain, Bin represent the same data comparatively frequently, the number of data transitions is smaller in the present variation than in the first embodiment, so that further power saving can be achieved in the present variation.

Conversely, in the case where the two signals Ain, Bin represent different data (i.e., Ain /Bin) comparatively frequently, the number of data transitions is smaller in the first embodiment than in the present variation, so that further power saving can be achieved in the first embodiment.

Second Variation

Figure 7:
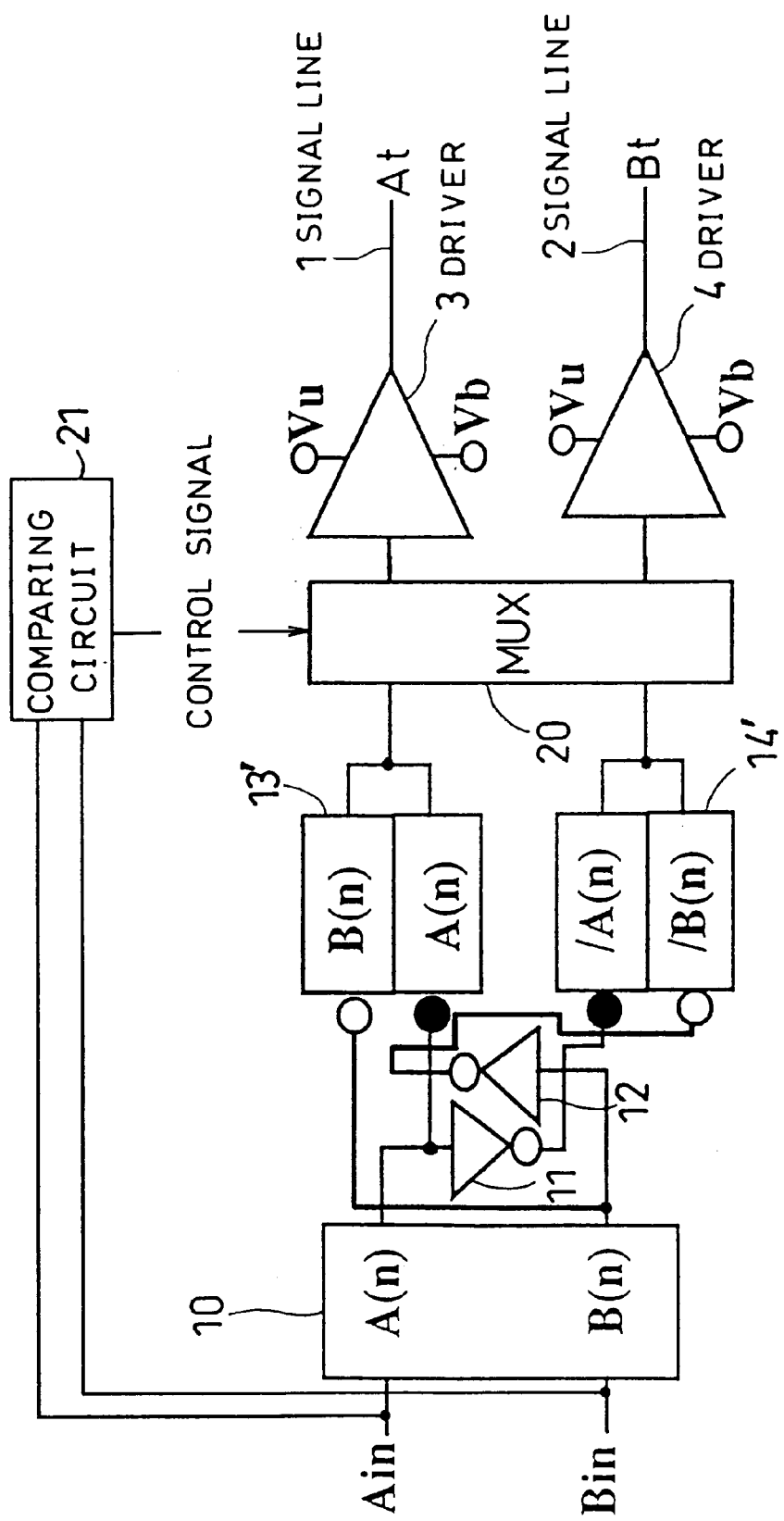
FIG. 7 is a circuit diagram showing a second variation of the present invention.

FIG. 7 shows a second variation of the signal transmitting circuit. The present variation is obtained by adding a multiplexer 20 to the structure of the above first variation shown in FIG. 6.

The above multiplexer (switching means) 20 receives a control signal from a comparing circuit 21 and assigns, based on the content of the control signal, one of the outputs from the two multiplexers 13' and 14' to either one of the signal lines 1 and 2 and the other of the outputs from the two multiplexers 13' and 14' to the other of the signal lines 1 and 2, prior to switching. The above comparing circuit 21 receives the two signals Ain, Bin, compares them with each other to judge whether they represent the same data or different data to obtain an interrelationship therebetween, and outputs the comparison result as a control signal to the multiplexer 20. In the case where the two signals Ain, Bin represent the same data, the above multiplexer 20 assigns, based on the above control signal, the output from the one multiplexer 13' to the signal line 1 and the output from the other multiplexer 14' to the signal line 2. Conversely, in the case where the two signals Ain, Bin represent different data, the above multiplexer 20 assigns the output from the one multiplexer 13' to the signal line 2 and the output from the other multiplexer 14' to the signal line 1.

Figure 8:
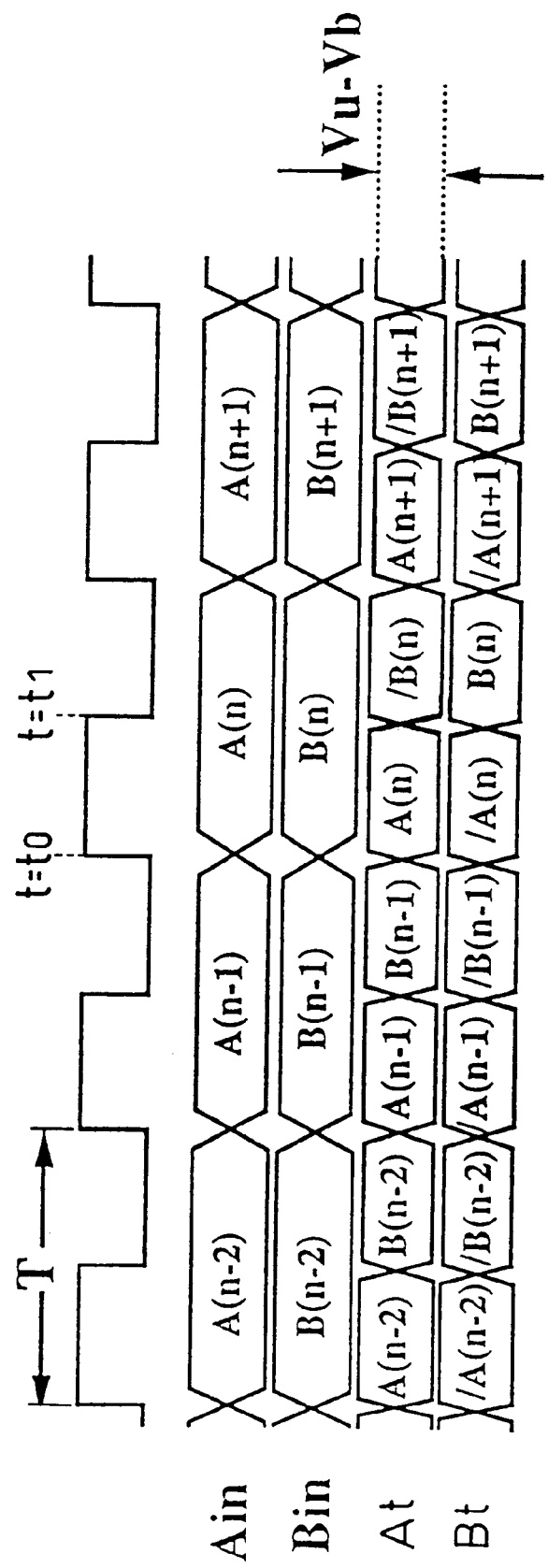
FIG. 8 is an operational timing chart of the second variation of the present invention.

Consequently, in the case where the two signals Ain, Bin represent the same data before a time point t=t0 in the present variation, signals Ain(n−2), Bin(n−2), Ain(n−1), and Bin(n−1) are outputted from the one multiplexer 13' to the signal line 1, while inverted signals /Ain(n−2), /Bin(n−2), /Ain(n−1), and /Bin(n−1) are outputted from the other multiplexer 14' to the signal line 2, as shown in FIG. 8. In the case where the two signals Ain, Bin represent different data after the time point t=t0, a signal Ain(n) is outputted from the one multiplexer 13' to the signal line 1 on the rising edge (t=t0) of the main clock MCLK, while a signal /A(n) is outputted from the other multiplexer 14' to the signal line 2. On the subsequent falling edge (t=t1) of the main clock MCLK, a signal /Bin(n) is outputted from the other multiplexer 14' to the signal line 1, while a signal Bin(n) is outputted from the one multiplexer 13' to the signal line 2.

Therefore, in the present variation, the number of data transitions on the signal lines 1 and 2 can be reduced irrespective of the interrelationship between respective sets of data represented by the signals Ain, Bin, thus enabling power saving.

Figure 26:
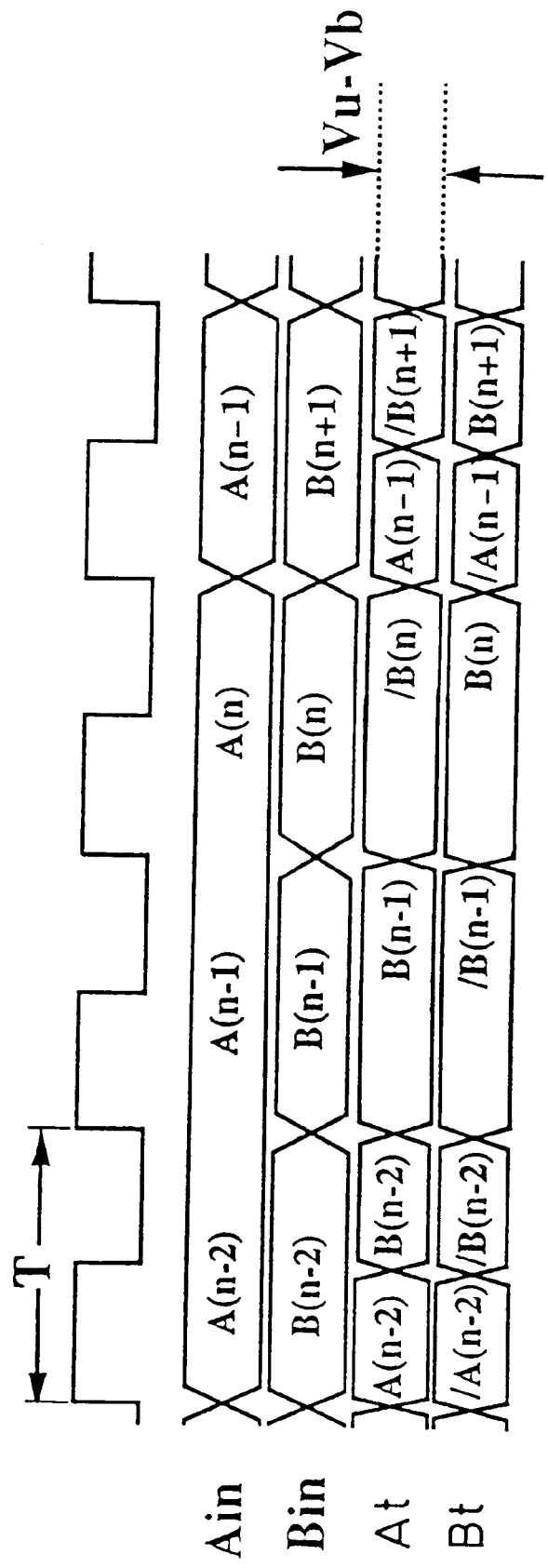
FIG. 26 is another operational timing chart of the second variation of the present invention.
Figure 27:
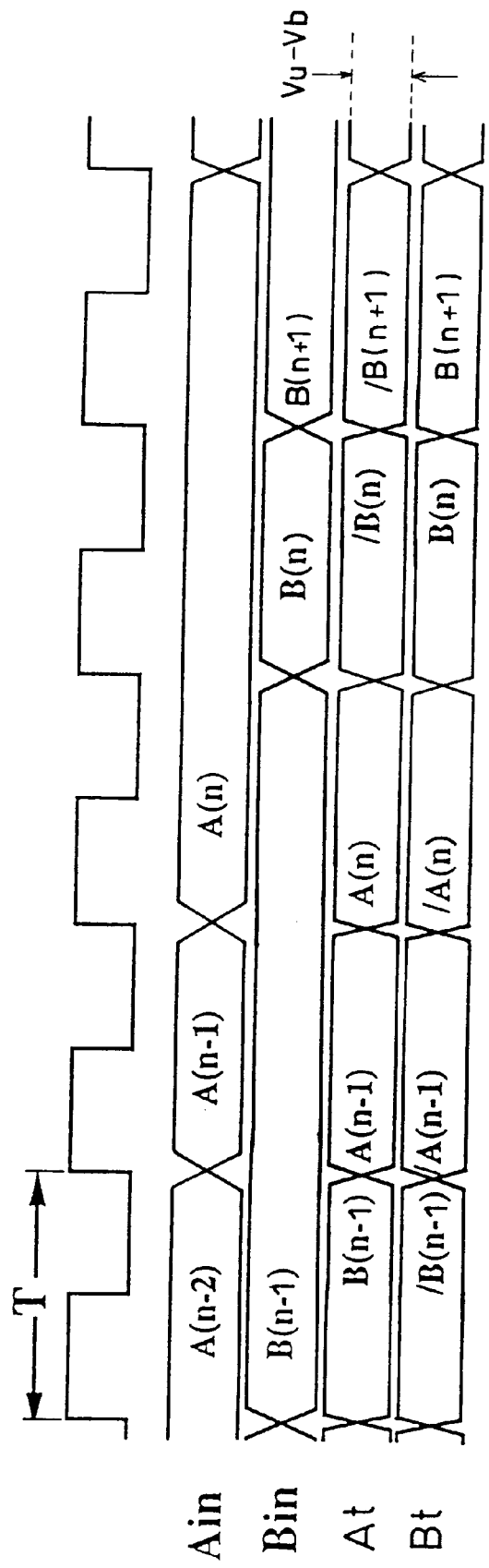
FIG. 27 is still another operational timing chart of the second variation of the present invention.

Although the signals Ain, Bin to be transmitted are alternately transmitted from the signals 1 and 2, the present invention is not limited to alternate transmission. As shown in FIG. 26, it is also possible to consecutively transmit the one signal Bin, e.g., a plurality of times (twice in the drawing) and then transmit the other signal Ain once, depending on the transition probabilities of the signals Ain, Bin to be transmitted. Alternatively, it is possible to consecutively transmit the one signal Bin, e.g., a plurality of times (twice in the drawing) and then transmit the other signal Ain a plurality of times (twice in the drawing).

Third Variation

Figure 9:
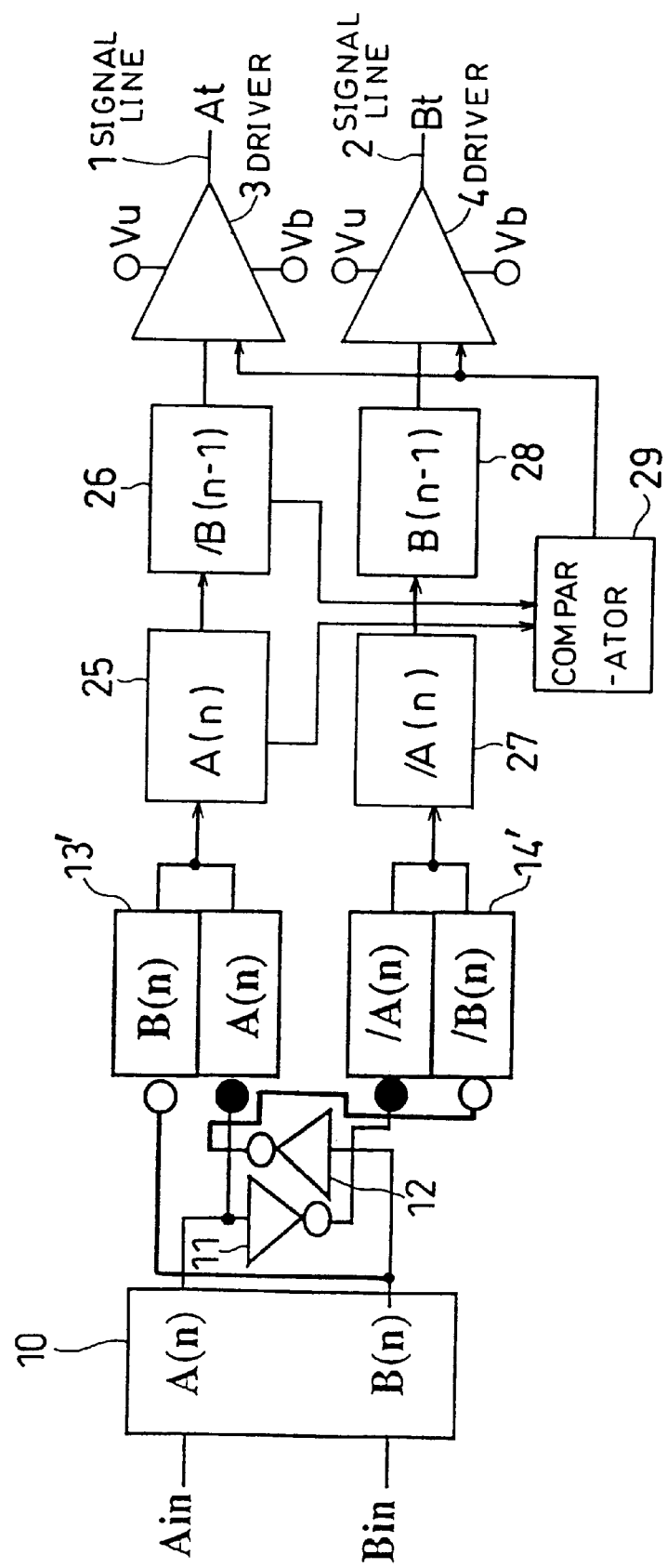
FIG. 9 is a circuit diagram showing a third variation of the present invention.

FIG. 9 shows a third variation of the signal transmitting circuit. In the present variation, shift registers (storing means) 25 to 28 in multiple stages (two stages in the drawing) are provided between the two multiplexers 13' and 14' of FIG. 5 showing the above first variation and a comparator 29 for controlling the above two drivers 3 and 4 is provided.

The above shift registers 25 and 26 in two stages store the output from the one multiplexer 13', while the other shift registers 27 and 28 in two stages store the output from the other multiplexer 14'.

The comparator 29 compares the respective contents of the shift registers 25 and 26 in two stages with each other and outputs, when the two contents coincide with each other, a control signal for disconnecting the two power source Vu and Vb from the two drivers 3 and 4 or a control signal for increasing the respective impedances of the power sources Vu and Vb to the two drivers 3 and 4.

Figure 10:
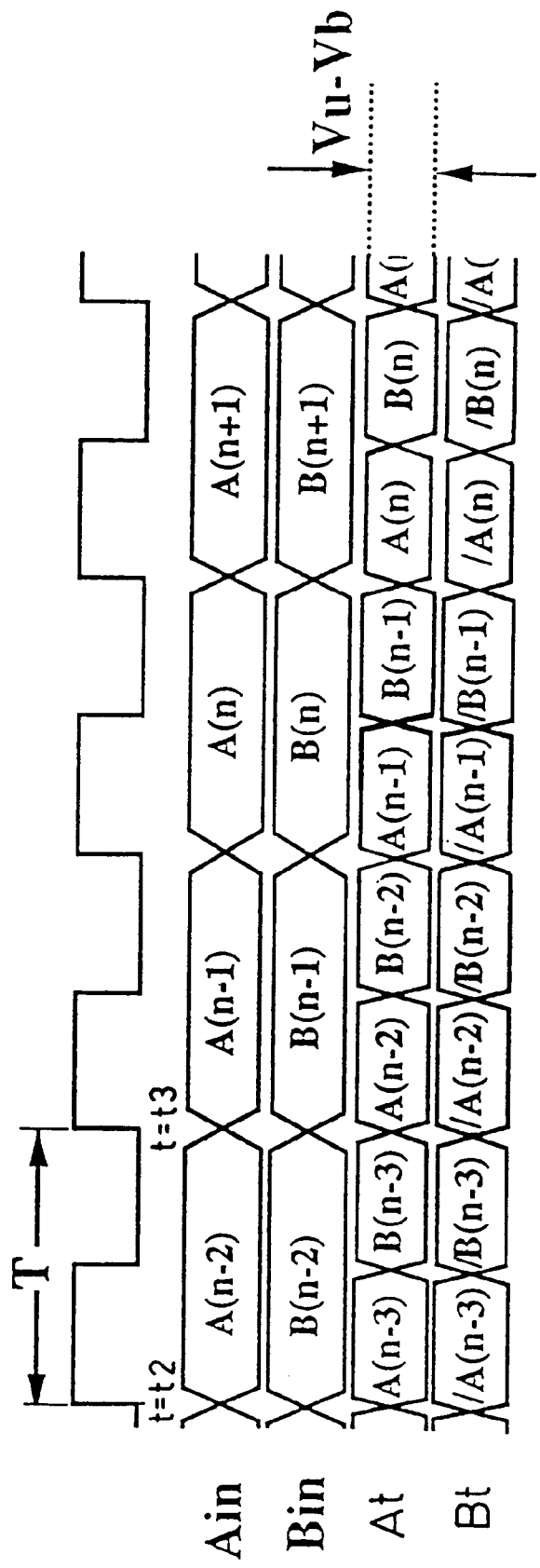
FIG. 10 is an operational timing chart of the third variation of the present invention.

Thus, in the present variation as shown in FIG. 10, a delay time (a time difference between a time point t=t2 and a time point t=t3 shown in the drawing, which corresponds to one period T of the main clock MCLK) is obtained between the timing of inputting the signals Ain, Bin and the timing of outputting the signals At, Bt to the signal lines 1 and 2, depending on the above clock frequency. Consequently, an allowance of time is made when the comparator 29 judges whether the data to be subsequently transmitted from the respective drivers 3 and 4 is the same as the data previously transmitted, thereby enabling a correct judgment. When the same data is to be transmitted, the drivers 3 and 4 disconnect the power sources Vu and Vb in response to the control signal outputted from the comparator 29 or increase the respective impedances of the two power sources Vu and Vb. As a result, the respective currents consumed by the drivers 3 and 4 can be saved, while holding the same data previously transmitted.

Although the shift registers (storing means) 25 to 28 each in two stages are provided in the present variation, it is also possible to provide only the shift registers (storing means) each in one stage (e.g., shift registers 25 and 27). In this case, the comparator 29 compares the respective contents of the above shift registers 25 and 27 each in one stage with the respective input signals Ain, Bin.

Fourth Variation

Figure 11:
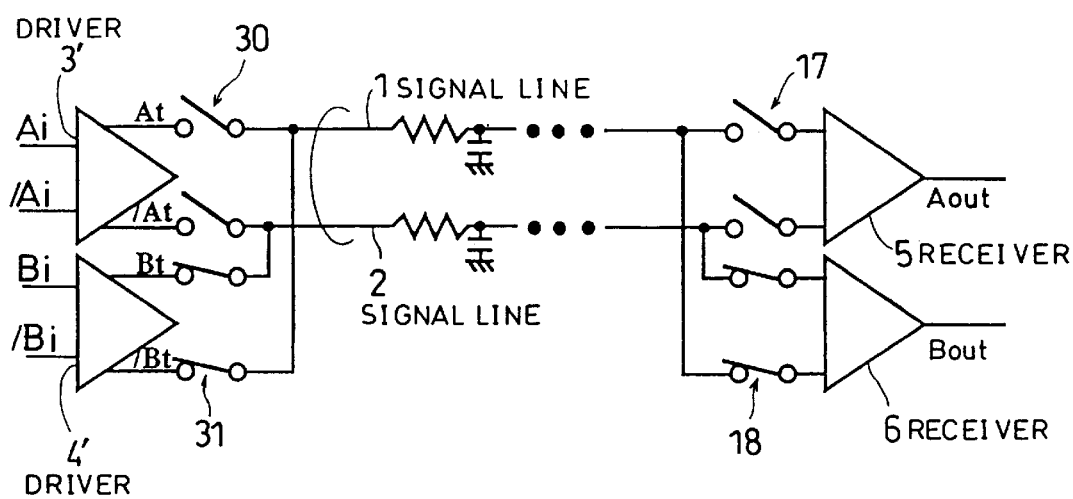
FIG. 11 is a circuit diagram showing a fourth variation of the present invention.

FIG. 11 shows a fourth variation of the signal transmitting circuit. Although each of the drivers 3 and 4 is composed of a driver of inverter type in the above first embodiment and in the above first to third variations, drivers 3' and 4' of differential-input/differential-output type are provided to correspond to the respective signals 1 and 2 in the present variation.

The one driver 3' receives the signal Ai from a multiplexer (not shown and corresponding to the multiplexer 13' shown in FIG. 9), converts the signal Ai to a differential signal At, /At, and outputs the differential signal. The other driver 4' receives the signal Bin from a multiplexer (not shown and corresponding to the multiplexer 14' shown in FIG. 9), converts the signal Bi to a differential signal Bt, /Bt, and outputs the differential signal.

In the respective stages subsequent to the above drivers 3' and 4' are positioned change-over switches 30 and 31. The one change-over switch 30 is controlled to be closed on the rising edge of the main clock MCLK, while the other change-over switch 31 is controlled to be closed on the falling edge of the main clock MCLK.

Since the drivers 3' and 4' thus output the differential signal in the present variation, during a period during which one driver (e.g., 3') is activated and connected to the two signal lines 1 and 2, the other driver (e.g., driver 4') can make preparations for data transmission. As a result, the time required for switching between the signals to be transmitted via the signal lines 1 and 2 can be reduced accordingly by the period during which the preparations can be made.

Fifth Variation

Figure 12:
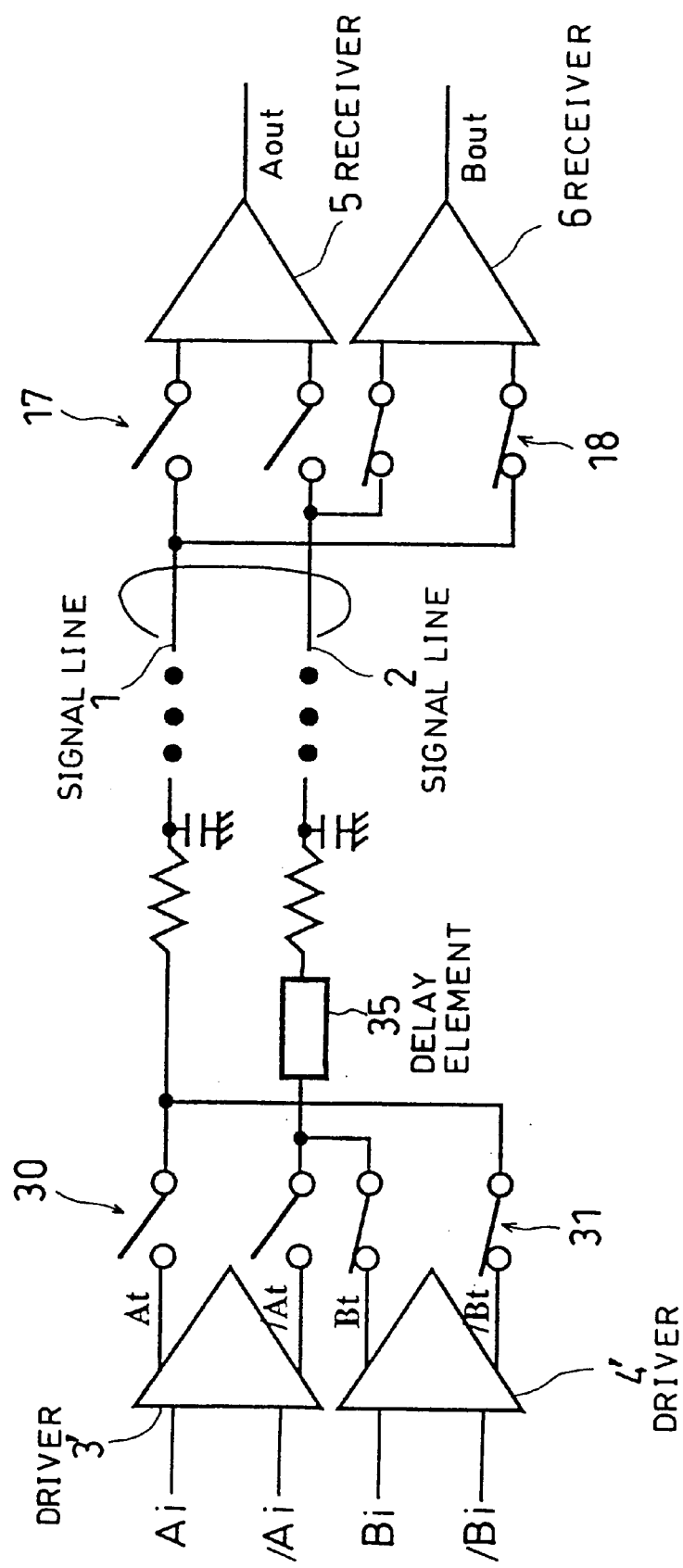
FIG. 12 is a circuit diagram showing a fifth variation of the present invention.

FIG. 12 shows a fifth variation of the signal transmitting circuit. The present variation is obtained by disposing a delay element 35 in series in one of the two signals 1 and 2 (signal line 2 in the drawing) in the structure of FIG. 11 showing the above fourth variation.

In the present variation, the signal transmitting circuit having the drivers 3' and 4' is provided on a given chip, while the signal receiving circuit having the receivers 5 and 6 is disposed on another chip, so that the two chips are connected to each other by the signal lines 1 and 2.

In signal transmission between the above two chips, the waveform of a signal being transmitted undulates and is disturbed under the influence of reflection or the like. The period T of the undulation of the transmitted waveform is determined by properties such as the lengths of the signal lines 1 and 2. The time period during which the above delay element 35 delays the transmission of the signal is set to about one half T/2 of the above period T determined by the lengths of the lines.

Figure 13A:
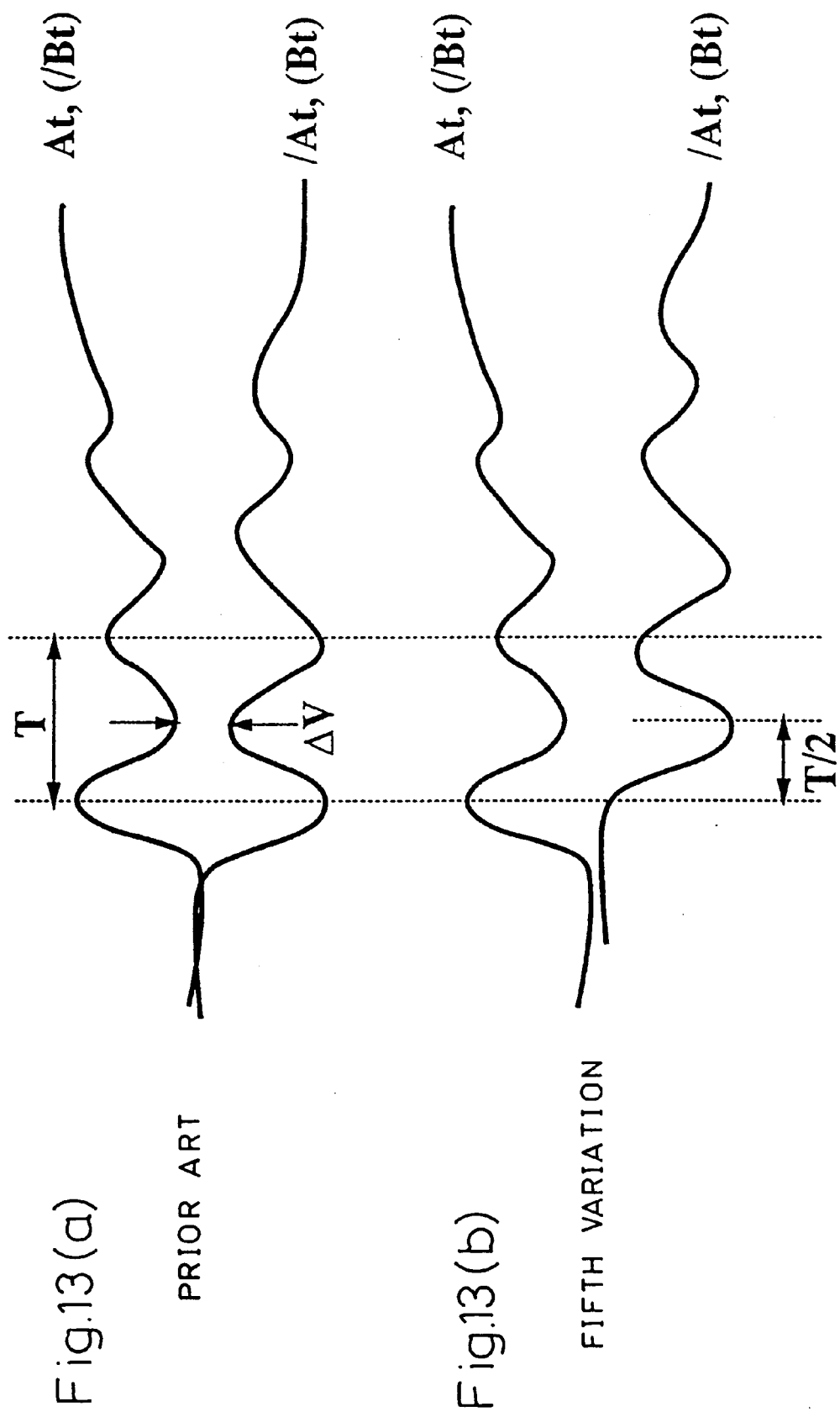
FIG. 13($a$) is a view showing the waveforms of respective signals on two signal lines in a conventional embodiment.

Thus, as shown in the operational waveform charts of FIGS. 13, a conventional embodiment of FIG. 13(a) is disadvantageous in that a potential difference between the signals on the differential lines 1 and 2 is extremely reduced due to the overlapping of waves, while the present variation of FIG. 13(b) can eliminate the disadvantage of the extremely reduced potential difference between the signals on the differential lines 1 and 2, since the period during which one waveform is disturbed is shifted from the period during which the other waveform is disturbed. Therefore, the present variation can effectively prevent a signal transfer rate from deteriorating.

Second Embodiment

Figure 14:
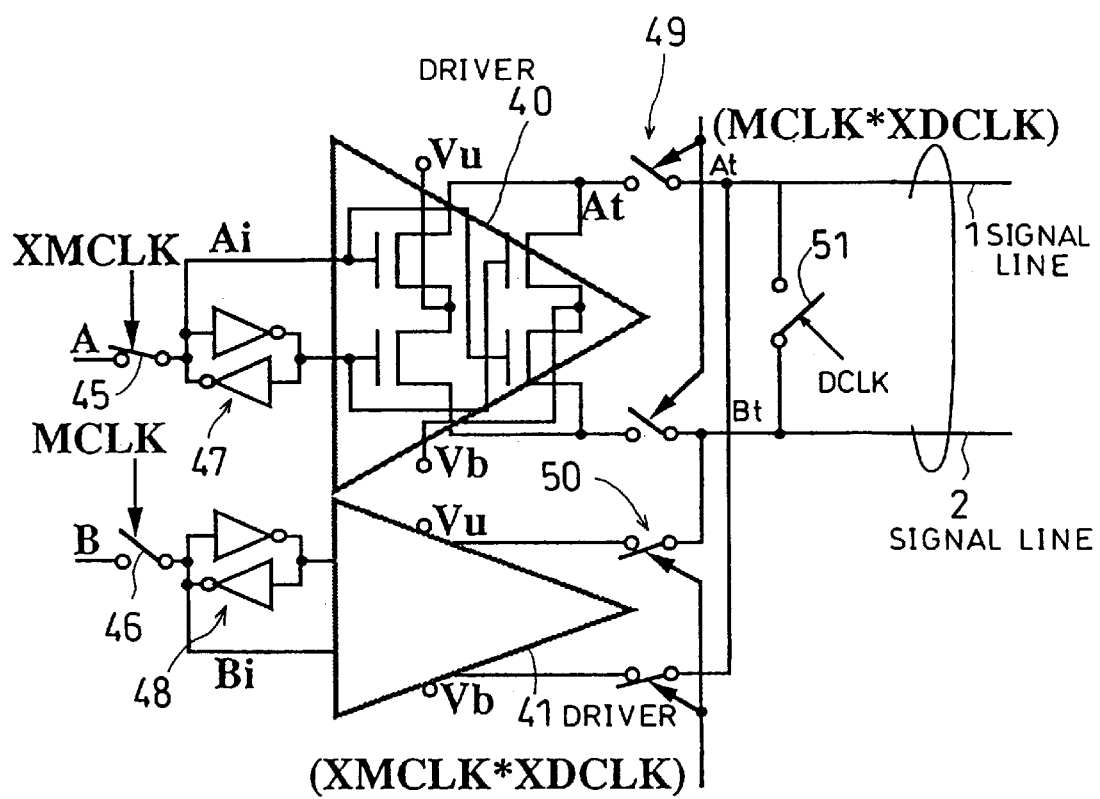
FIG. 14 is a circuit diagram showing a second embodiment of the present invention.
Figure 15:
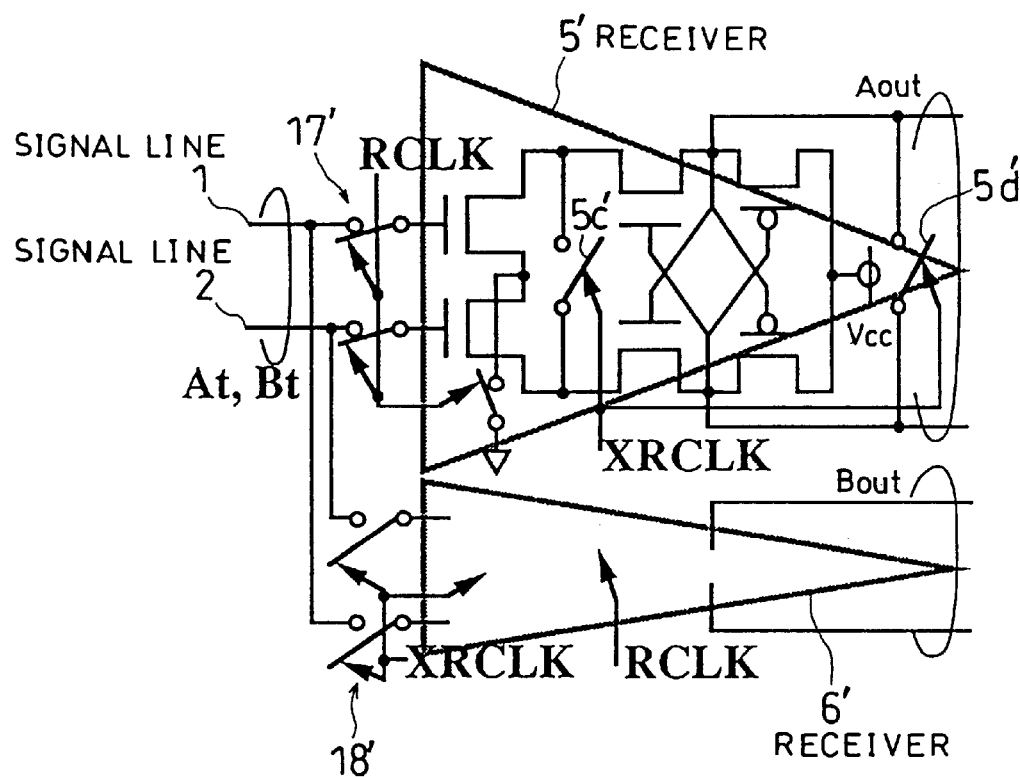
FIG. 15 is a circuit diagram showing in detail a receiver in the second embodiment of the present invention.

FIGS. 14 and 15 show a second embodiment of the present invention.

In the case of transmitting the pair of signals Ain, Bin by means of the two signal lines 1 and 2, the present embodiment further half-precharges the signal lines 1 and 2 when the one signal Ain and the inverted signal /Ain thereof are differentially transmitted in the early half of the main clock MCLK, while the other signal Bin and the inverted signal /Bin are transmitted in the late half of the main clock MCLK, as described above.

Figure 16:
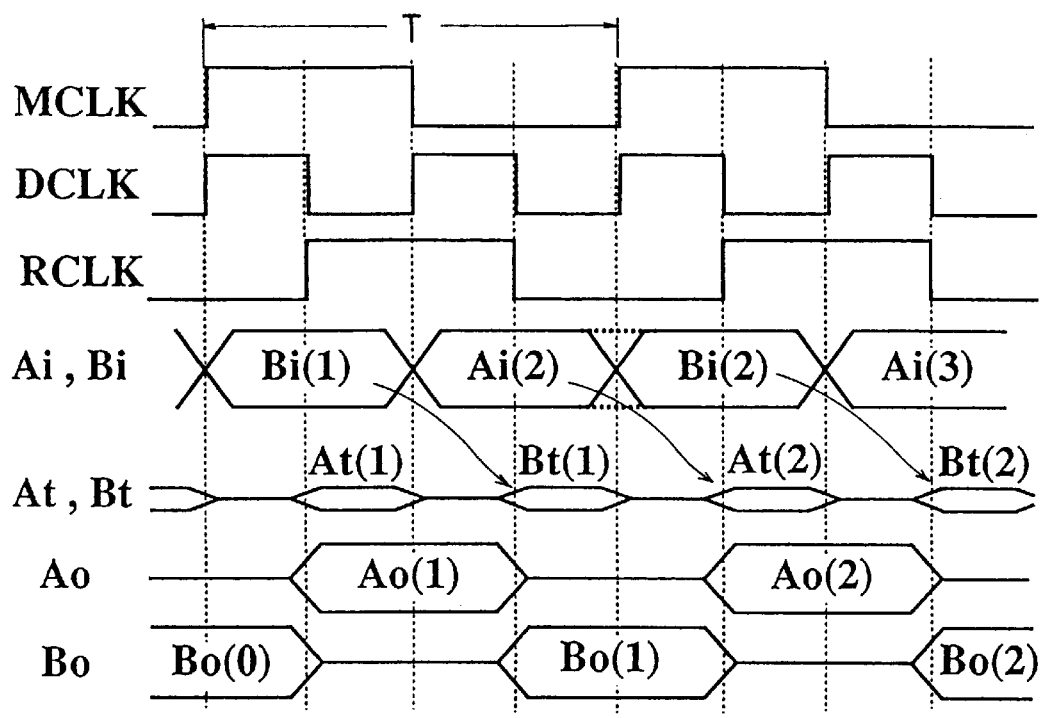
FIG. 16 is an operational timing chart of a signal transmitting circuit of the second embodiment of the present invention.

Since the present embodiment requires a precharging period in executing half-precharging, two precharging operations and two data transfers are performed in one period T of the main clock MCLK in synchronization with a signal DCLK having double the period of the main clock MCLK, as shown in FIG. 16.

FIG. 14 shows the signal transmitting circuit of the present embodiment, while FIG. 15 shows the signal receiving circuit of the present embodiment.

In FIG. 14 are shown: the signal lines 1 and 2; and drivers 40 and 41. The drivers 40 and 41 are of differential-input/differential-output type and the differential output thereof is connected to the above two signal lines 1 and 2. In the respective stages previous to the drivers 40 and 41 are positioned switches 45 and 46, respectively. The one switch 45 is closed when an inverted signal XMCLK of the main clock MCLK is "H," while the other switch 46 is closed when the main clock MCLK is "H." In the stages subsequent to the switches 45 and 46 are positioned respective latch circuits 48. The latch circuits 47 and 48 invert signals A and B inputted through the switches 45 and 46, while latching the inputted signals A and B, respectively.

The above one driver 40 receives, as a differential input, the signal A from the corresponding switch 45 and an inverted signal /A from the latch circuit 47. The above other driver 41 receives, as a differential input, the signal B from the corresponding switch 46 and an inverted signal /B from the latch circuit 48.

The above drivers 40 and 41 have the same structure. As can be seen from the internal structure of the driver 40 shown in the drawing, a potential difference between the differential inputs A, /A is amplified to become the potential difference between the power source Vu and the power source Vb and is outputted as a differential signal to the signal lines 1 and 2.

Between the drivers 40 and 41 and the signal lines 1 and 2 are positioned switches (switching means) 49 and 50, respectively. The one switch 49 is closed when the main clock MCLK is "H" and when an inverted signal XDCLK of the signal DCLK having double the period of the main clock MCLK is "H." The other switch 50 is closed when the inverted signal XMCL is "H" and when the inverted signal XDCLK of the signal having double the period of the inverted signal XMCLK is "H." Consequently, each of the drivers 40 and 41 amplifies the inputted differential signal and the amplified differential signal is outputted to the signal lines 1 and 2 by the closing operations of the switches 49 and 50 when ¾ of the period of the main clock has elapsed since the inputting of the differential signal.

To each of the above signal lines 1 and 2 is connected a switch (precharging means) 51 for connecting and precharging the two signal lines 1 and 2 to a potential intermediate between the potentials of the two signal lines 1 and 2.

The switch 51 is closed when the signal DCLK having double the period of the main clock is "H." Consequently, half-precharging of the signal lines 1 and 2 is executed in the early half of each half-period of the main clock MCLK.

Figure 2:
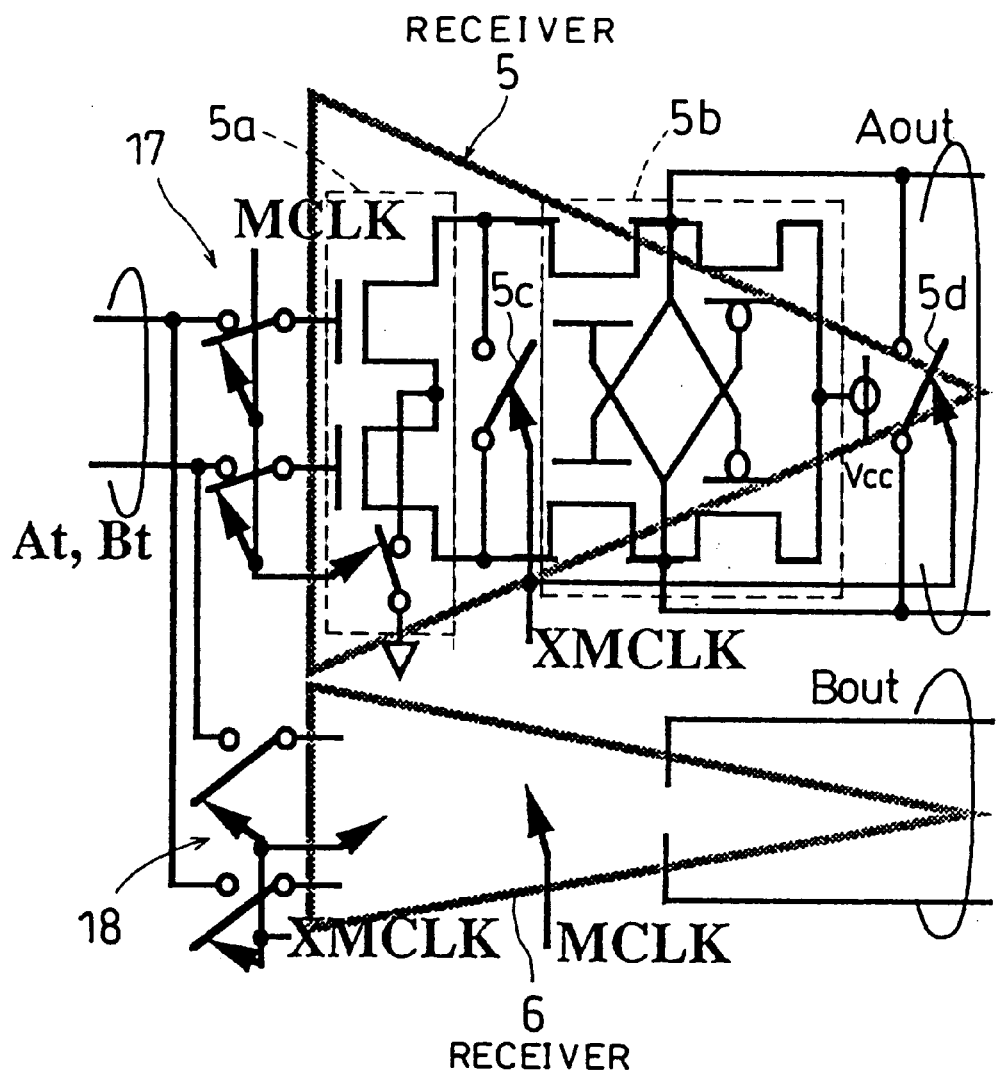
FIG. 2 is a circuit diagram showing in detail a receiver in the first embodiment of the present invention.

Since the signal receiving circuit shown in FIG. 15 transmits the differential signal to the signal lines 1 and 2 with a delay of ¾ of the period of the main clock MCLK, the structure thereof is different from the structure of the signal receiving circuit of the above first embodiment shown in FIG. 2 in respect of the following points.

Specifically, switches 17' and 18' are closed when a signal RCLK delayed by ¾ of the period from the main clock MCLK is "H" and when an inverted signal XRCLK thereof is "H," respectively. In one receiver 5', switches 5c' and 5d' (equivalent switches in the other receiver 6' are not shown in the drawing) are closed when the above signal XRCLK is "H" and the above signal RCLK is "H," respectively, thereby precharging the receiver 5' thereof. The internal structures of the receivers 5' and 6' are the same as those of the receivers 5 and 6 in the above first embodiment.

Next, a description will be given to the operation of the present embodiment with reference to the timing chart shown in FIG. 16. In the early half of one period T of the main clock MCLK, the switch 46 is closed and the signal B is inputted to the driver 41. On the other hand, the switch 50 is open.

Thereafter, in the late half of one period T of the main clock MCLK, the above switch 46 is opened, while the other switch 45 is closed, so that the signal A is inputted to the driver 40. On the other hand, the switch 49 is open.

In the early half of the late half of one period T of the above main clock MCLK, the switch 50 as well as the switch 49 are open, while the switch 51 is closed. As a result, the switch 51 connects the signal lines 1 and 2 to each other and half-precharging is executed.

In the late half of the late half of one period T of the above main clock MCLK, the above switch 51 is opened, while the switch 50 is closed. Consequently, a differential signal from the above driver 41 is transmitted as a signal Bt(1) to the above precharged signal lines 1 and 2. In the signal receiving circuit, on the other hand, the switch 18' shown in FIG. 15 is closed and the differential signal Bt(1) transmitted to the above signal lines 1 and 2 is inputted to the receiver 6' corresponding to the above driver 41 and received.

Subsequently, in the early half of the early half of another one period T of the main clock MCLK, the above switch 50 is opened, while the switch 51 is closed, so that the signal lines 1 and 2 are connected to each other again and half-precharging is executed.

Thereafter, in the late half of the early half of another one period T of the main clock MCLK, the above switch 51 is opened, while the switch 49 is closed. As a result, the signal A inputted to the above driver 40 is transmitted as a differential signal At(2) to the above half-precharged signal lines 1 and 2. In the signal receiving circuit, on the other hand, the switch 17' shown in FIG. 15 is closed and the differential signal At(2) transmitted to the above signal lines 1 and 2 are inputted to the receiver 5' corresponding to the above driver 40 and received.

Thus, although the two sets of data Ain, Bin are transmitted during one period T of the main clock MCLK, transmission based on half-precharing is executed in the present embodiment, which advantageously halves the amount of charges required for obtaining a given potential difference to be produced between the differential signal lines 1 and 2 in executing one differential transmission. As a result, the total power consumption is not increased. On the contrary, power saving can be achieved since data transmission with a small amplitude is accomplished.

Third Embodiment

Figure 17:
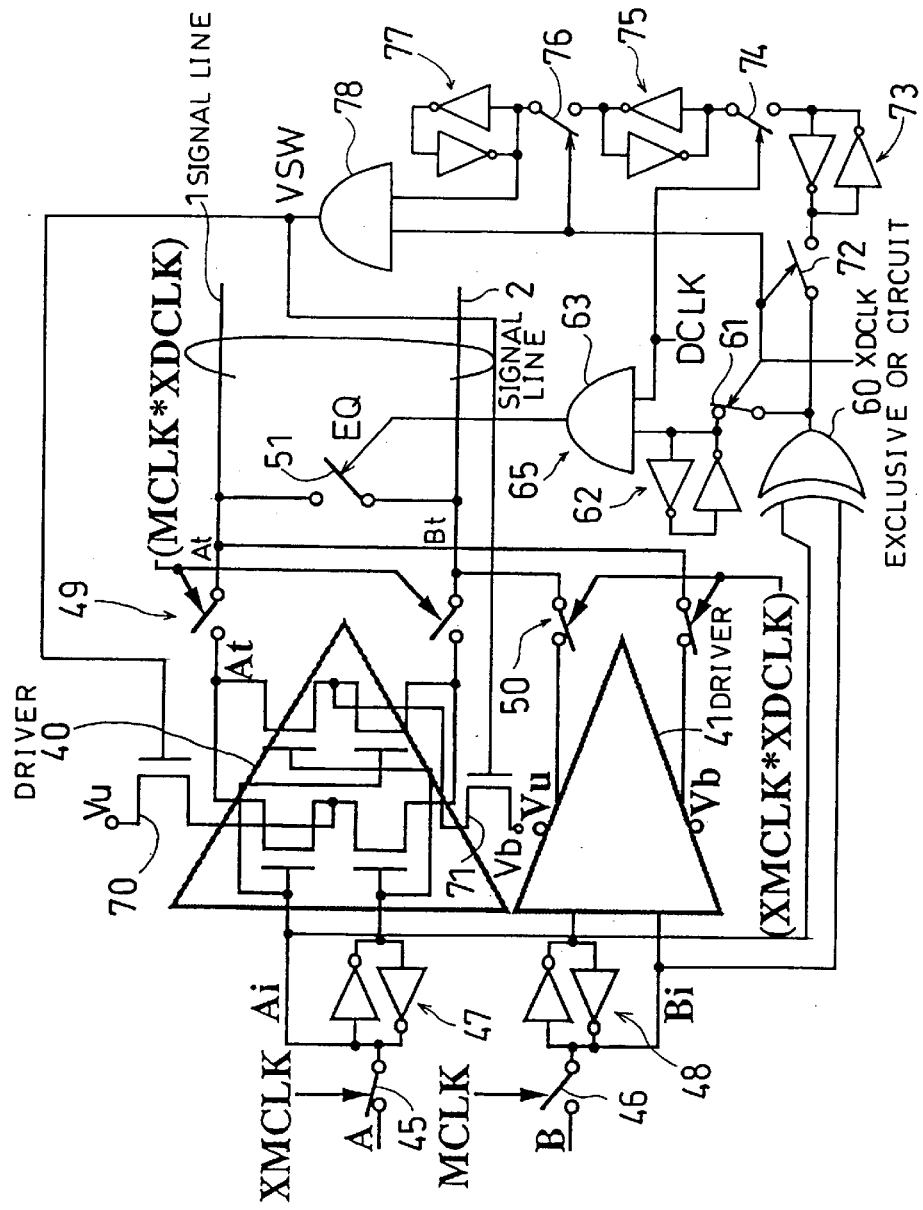
FIG. 17 is a circuit diagram showing a third embodiment of the present invention.

FIG. 17 shows a third embodiment of the present invention. The present embodiment was obtained by modifying the above second embodiment.

Specifically, although the above second embodiment has adopted the structure of executing half-precharging in terms of higher-speed operation and power saving, the structure is disadvantageous in that, when data having a low probability of making a transition is inputted, the same data is repeatedly transmitted and half-precharging, which is not originally required, is uselessly executed, resulting in an increase in power consumption.

Figure 19:
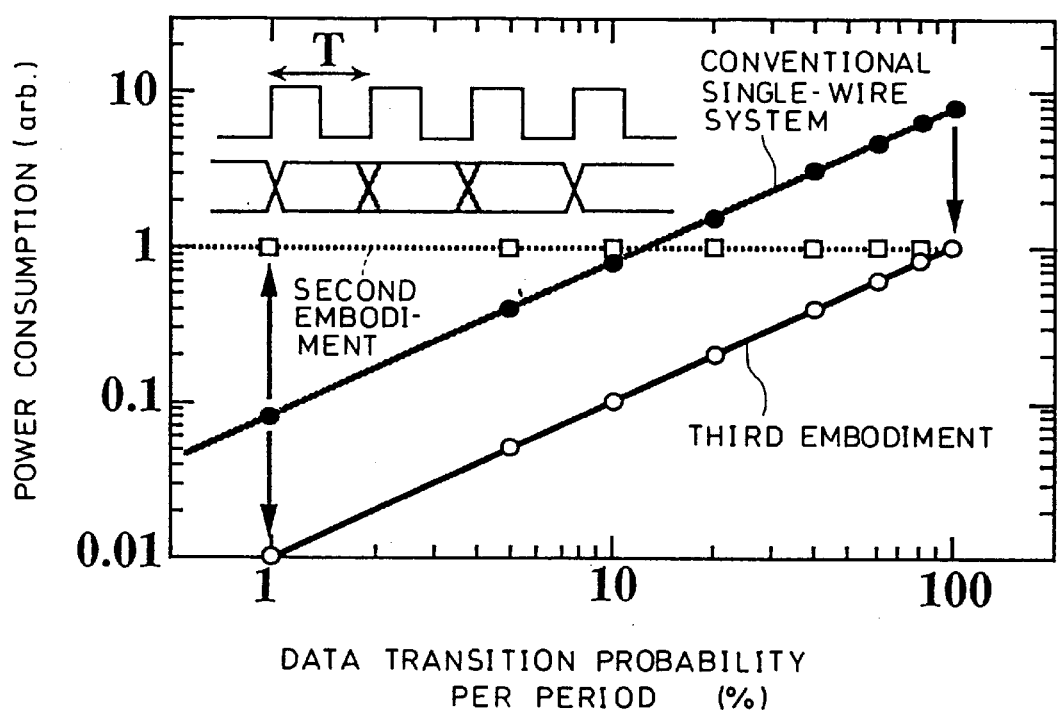
FIG. 19 is a view illustrating an effect of the third embodiment of the present invention.

FIG. 19 shows a relationship between the data transition probability mentioned above and power consumption. As can be seen from the drawing, when the data transition probability becomes lower than 10%, power consumption is disadvantageously increased in a differential system (i.e., the second embodiment) which requires half-precharging. To eliminate the disadvantage, the structure of the second embodiment has been modified, resulting in the present embodiment.

FIG. 17 shows the structure of the present embodiment. The present embodiment is obtained by adding a structure for inhibiting useless precharging to the structure of FIG. 14 showing the second embodiment.

Below, a description will be given only to the added structure in FIG. 17. As for the same structure as used in the second embodiment, the description thereof will be omitted by providing like components with like reference numerals.

In FIG. 17 is shown an input-data-transition detecting circuit (transition detecting means) 60 composed of an exclusive OR circuit. The transition detecting circuit 60 receives the signal Ai inputted via the switch 45 and the signal Bi (i.e., the signal Bi transmitted subsequently to the above signal Ai) inputted via the other switch 46 and outputs an input-data-transition detection signal (High signal) when there is no coincidence between the two signals Ai and Bi or outputs a coincidence detection signal (Low signal) where there is a coincidence between the two signals Ai and Bi.

In FIG. 17 are also shown: a switch 61 which is closed when the inverted signal XDCLK of the signal DCLK having double the period of the main clock is "H"; a latch circuit 62: and an AND circuit 63. The above latch circuit 62 latches the output from the above input-data-transition detecting circuit 60 when the above switch 62 is closed. The above AND circuit 63 receives the output from the latch circuit 62 and the signal DCLK having double the period of the main clock and outputs an equalize signal EQ for equalizing the signal lines 1 and 2 when each of the two received signals is "H," i.e., when the signal DCLK having double the period of the main clock is "H" and the input-data-transition detection signal (High signal) is received from the latch circuit 62 or does not output the equalize signal EQ when the output from the latch circuit 62 is the coincidence detection signal (Low signal). The switch 51 is closed on receiving the equalize signal EQ from the above AND circuit 63.

The above switch 61, latch circuit 62, and AND circuit 63 constitute a control means 65. When the input-data-transition detection signal (High signal) is outputted from the input-data-transition detecting circuit 60, the control means 65 enables, with the outputting of the equalize signal EQ, precharging after half the period T/2 has elapsed since the outputting of the input-data-transition detection signal. When the coincidence detection signal (Low signal) is outputted from the input-data-transition detecting circuit 60, on the other hand, the control means 65 inhibits, with the inhibition of the outputting of the equalize signal EQ, precharging after half the period T/2 thereof has elapsed.

In FIG. 17 are also shown: an N-channel transistor 70 for supplying the voltage of the power supply Vu to the driver 40; an N-channel transistor 71 for supplying the voltage of the power source Vb to the above driver 40; switches 72 and 76 which are closed when the inverted signal XDCLK of the signal DCLK having double the period of the main clock is "H"; a switch 74 which is closed when the signal DCLK having double the period of the main clock is "H"; latch circuits 73, 75, and 77 in three stages. The above latch circuit 73 latches the output from the input-data-transition detecting circuit 60 when the above switch 72 is closed. The latch circuit 75 latches the output from the above latch circuit 73 when the above switch 74 is closed. The latch circuit 77 latches the output from the above latch circuit 75 when the above switch 76 is closed. Hence, the output from the input-data-transition detecting circuit 60 is delayed by the above latch circuits 73, 75, and 77 in three stages by ¾ of the period T of the main clock MCLK and outputted from the latch circuit 77 in the final stage.

In FIG. 17, a reference numeral 78 designates an AND circuit, which receives the inverted signal XDCLK of the signal DCLK having double the period of the main clock and the output from the above latch circuit 77 in the final stage and outputs a power-source control signal (High signal) VSW when each of the two received signals is "H," i.e., when the inverted signal XDCLK of the signal having double the period of the main clock is "H" and the input-data-transition detection signal (High signal) is received from the latch circuit 77 or does not output the power-source control signal (High signal) VSW when the output from the latch circuit 77 in the final stage is the coincidence detection signal (Low signal). The two N-channel transistors 70 and 71 are turned ON on receiving the power-source control signal (High signal) VSW from the above AND circuit 78 and connects each of the power sources Vu and Vb to the driver 40. Conversely, the two N-channel transistors 70 and 71 are turned OFF when the AND circuit 78 does not output the power-source control signal (High signal) and disconnects the power sources Vu and Vb from the driver 40.

Figure 18:
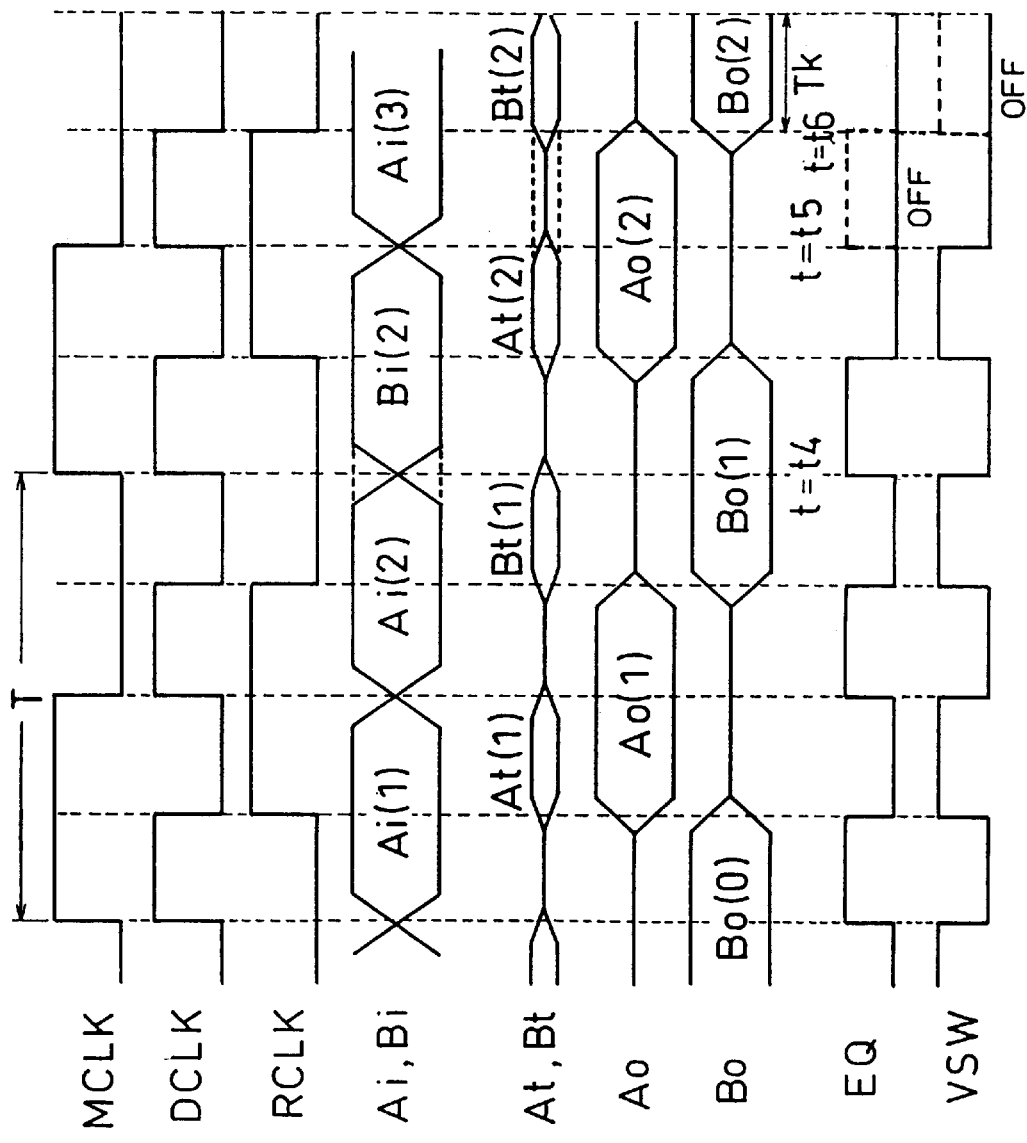
FIG. 18 is an operational timing chart of a signal transmitting circuit of a third embodiment of the present invention.

Thus, in the present embodiment as shown in FIG. 18, when the coincidence of the signal Ai(2) and the signal Bi(2) is detected by the input-data-transition detecting circuit 60 at a time point t=t4, for example, the AND circuit 63 will not output the equalize signal EQ at a time point t=t5, which is half the period T/2 after the time point t=t4. Accordingly, the switch 51 remains closed and hence the signal lines 1 and 2 are not connected, so that the execution of half-precharging is inhibited, as shown in FIG. 18. At a time point t=t6, which is ¾ of the period after the time point t=t4, the AND circuit 78 does not output the power-source control signal VSW, as shown in FIG. 18, so that the two N-channel transistors 70 and 71 are turned OFF, thereby disconnecting the power sources Vu and Vb from the driver 40. As a result, the signals Ain, Bin are held in the signal lines 1 and 2 due to the wiring capacitances thereof, while the currents passing through the interiors of the drivers 3 and 4 are suppressed, resulting in a reduction in consumed currents.

Figure 20:
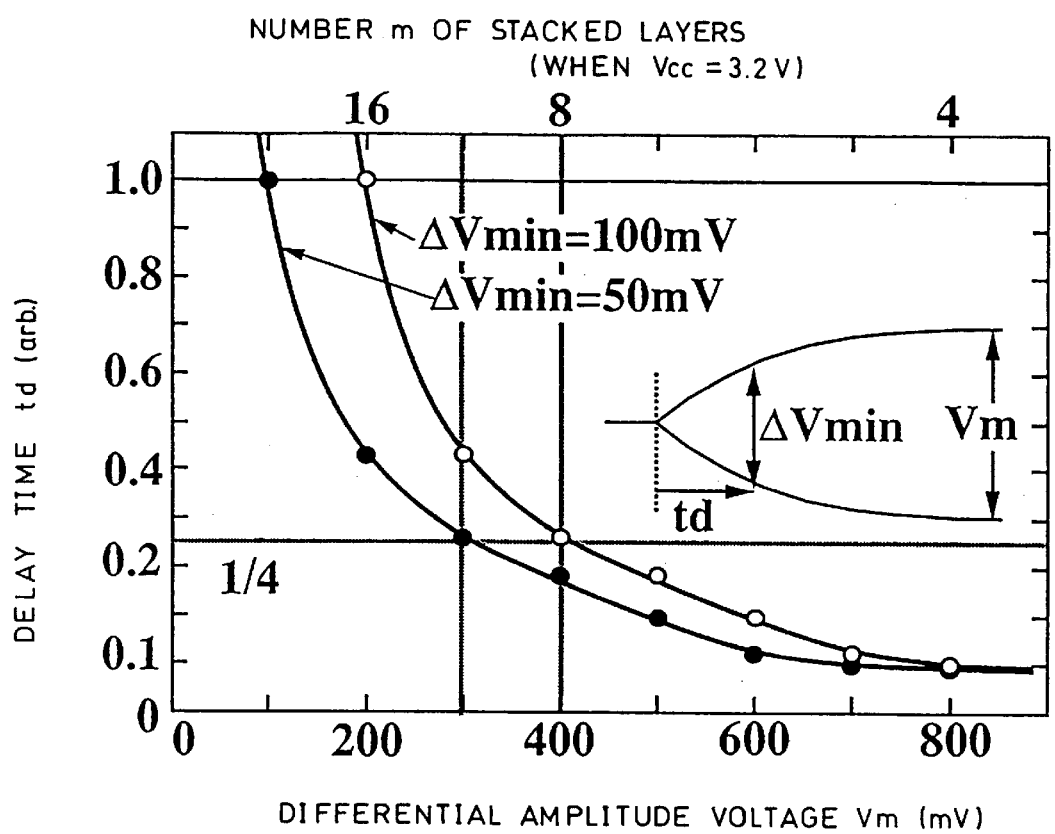
FIG. 20 is a view illustrating a minimum differential amplitude voltage with which the same data transfer rate as obtained in the conventional embodiment can be surely obtained in the third embodiment of the present invention.

FIG. 20 shows the result of an examination to determine whether or not the second and third embodiments are actually operable without deteriorating the transfer rates. In the drawing is shown a differential amplitude voltage ΔVmin which can be stably detected by the receivers 5, 6, 5', and 6' of differential type. If the value of the differential amplitude voltage ΔVmin is assumedly 100 mV, e.g., it can be seen from the drawing that the intersection of the curve representing a delay time required for producing the differential voltage (100 mV) and the abscissa representing ¼ of a delay time when a voltage makes a transition till a potential difference, which is exactly one half of the potential difference on a level used in a CMOS such as a conventional inverter, is reached falls at a point where the differential amplitude voltage ΔVmin is 400 mV. On the other hand, if the value of the differential amplitude voltage ΔVmin is assumedly 50 mV, e.g., the above intersection falls at a point where the differential amplitude voltage ΔVmin is 300 mV. This indicates that, even when the differential amplitude voltage is reduced to have a value of 400 mV or 300 mV, two precharging operations and two data transmissions can be performed within one period of the main clock MCLK. Thus, in the second and third embodiments, time-multiplexed differential transmission can be achieved with low differential amplitude voltages reaching the above reduced values without deteriorating transfer rate.

Fourth Embodiment

Figure 21:
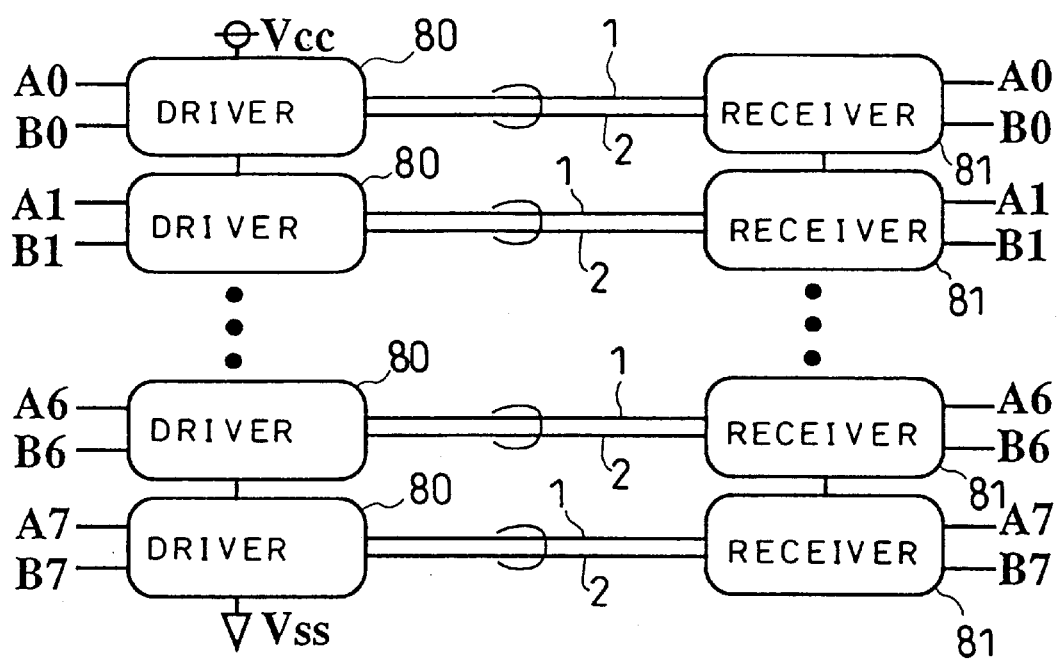
FIG. 21 is a circuit diagram showing a fourth embodiment of the present invention.

FIG. 21 shows a fourth embodiment of the present invention. In the present embodiment, a plurality of drivers and receivers are provided and the plurality of drivers are assumedly connected in series between the power source Vcc and the ground Vss.

Specifically, in FIG. 21 are shown: drivers 80 in multiple stages (m 8 in the drawing); receivers 81 which are equal in number to the above drivers 80; and the signal lines 1 and 2 positioned between the drivers 80 and the corresponding receivers 81.

Each of the above drivers 80 is composed of the above pair of drivers 40 and 41 shown in FIG. 17. Each of the receivers 81 is composed of the pair of receivers 5' and 6' shown in FIG. 15.

The above plurality of drivers 80 are so constituted that a second supply terminal (corresponding to the supply terminal 3b, 4b of FIG. 1) of each of the drivers 80 is connected to a first supply terminal (corresponding to the supply terminal 3a, 4a of FIG. 1) of the driver 80 positioned in its lower stage, the first supply terminal of the driver 80 in the uppermost stage is connected to the first power source Vcc, and the second supply terminal of the driver 80 in the lowermost stage is connected to the ground (second power source) Vss.

The driver 80 operating at a potential lower than one half Vcc/2 of the first power source Vcc is constituted by an N-type MOSFET, while the driver 80 operating at a potential higher than one half Vcc/2 of the first power source Vcc is constituted by a P-type MOSFET. With the constitutions, the gate-to-source voltages in the MOSFETs constituting the respective drivers 80 are increased, thereby enabling stable operation.

Each of the receivers 81 uses the first power source Vcc and the ground (second power source) Vss as the respective power sources for supplying the High and Low signals. However, since input potentials are different in different stages, the receiver 81 operating at a potential lower than one half Vcc/2 of the first power source Vcc is constituted by a P-type MOSFET which operates around the potential with a shorter delay time, while the receiver 81 operating at a potential higher than one half Vcc/2 of the first power source Vcc is constituted by an N-type MOSFET which operates around the potential with a shorter delay time. With the constitutions, each of the receivers 81 can surely operate with high sensitivity.

Figure 22:
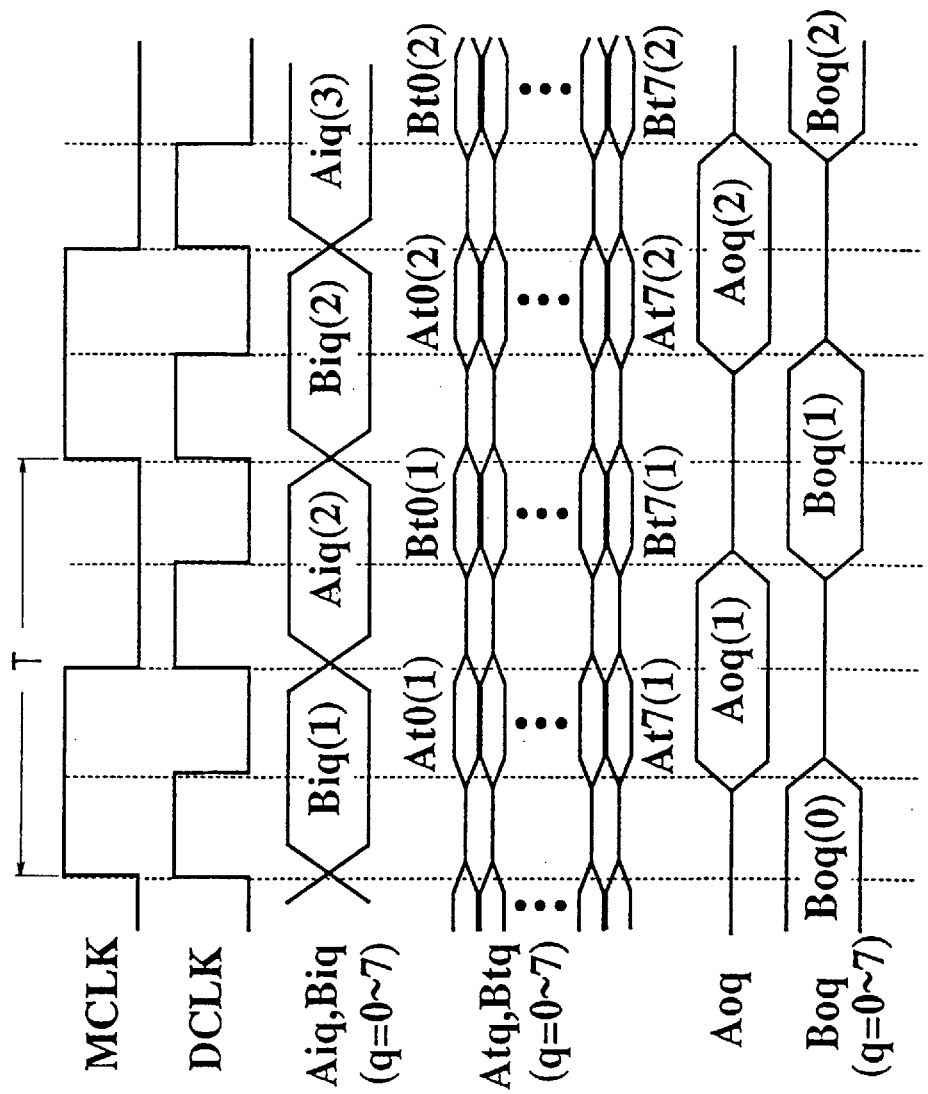
FIG. 22 is an operational timing chart of a signal transmitting circuit of the fourth embodiment of the present invention.

In each of the drivers 80, the control transistors 70 and 71 shown in FIG. 17 are simultaneously turned ON when the inputted differential signals (Ai,/Ai), (Bi,/Bi) are differentially amplified to reach the potential difference (Vu−Vb= Vcc/8). As a result, the signal line having a decreasing potential is connected to that signal line of the pair of signal lines which has an increasing potential and which is positioned in the stage lower than the signal line having a decreasing potential, as can be seen from the waveforms of respective signals Atq, Btq on the signal lines 1 and 2 shown in FIG. 22. Consequently, the charges in the above signal line having a decreasing potential are released into the above signal line having an increasing potential and reused, so that data transfer can be performed while recycling charges. Thus, the present embodiment enables remarkably effective power saving.

Figure 23:
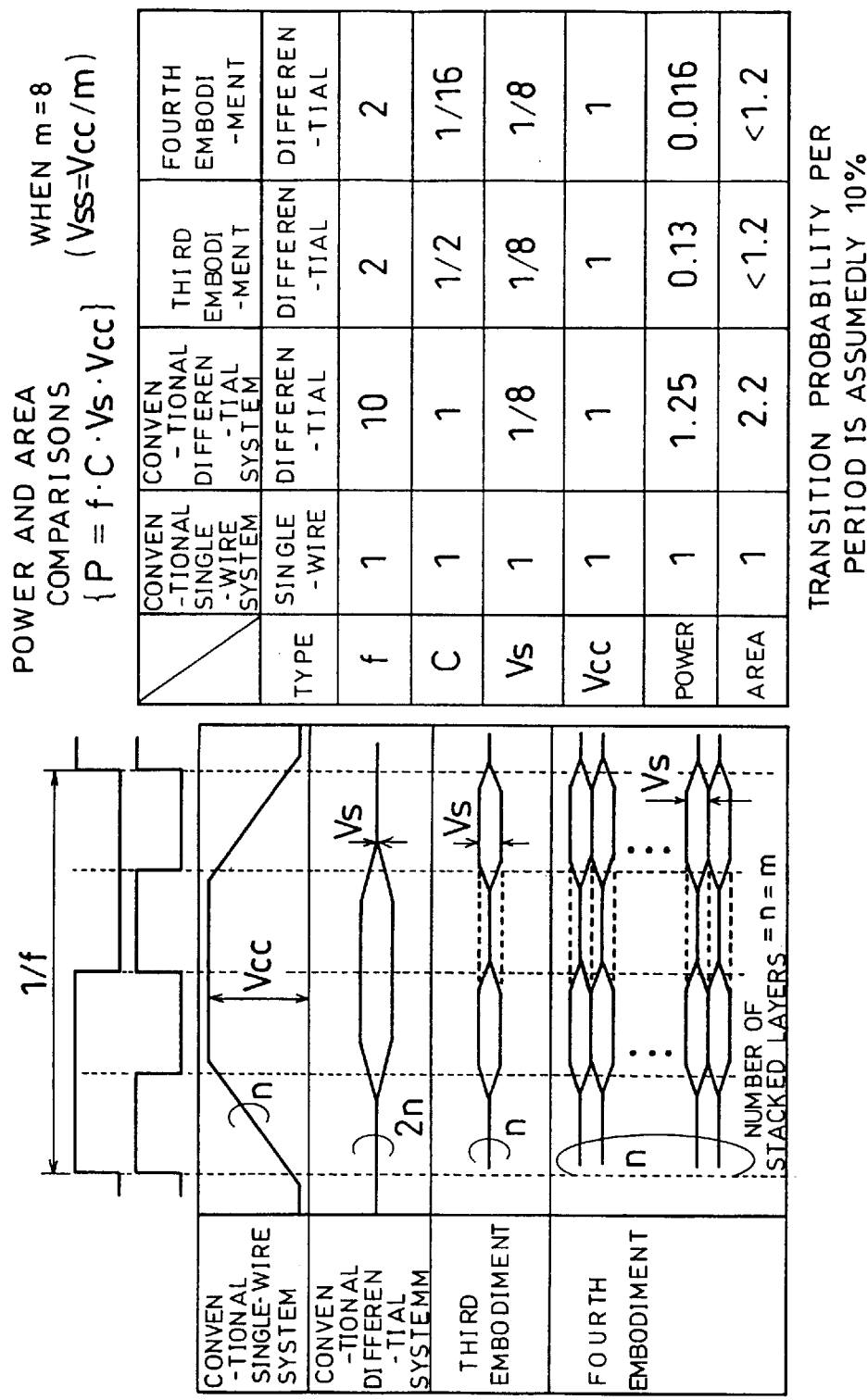
FIG. 23 is a view showing for comparison respective power consumptions in the third and fourth embodiments of the present invention, in conventional single-wire transmission, and in conventional differential transmission.
Figure 24:
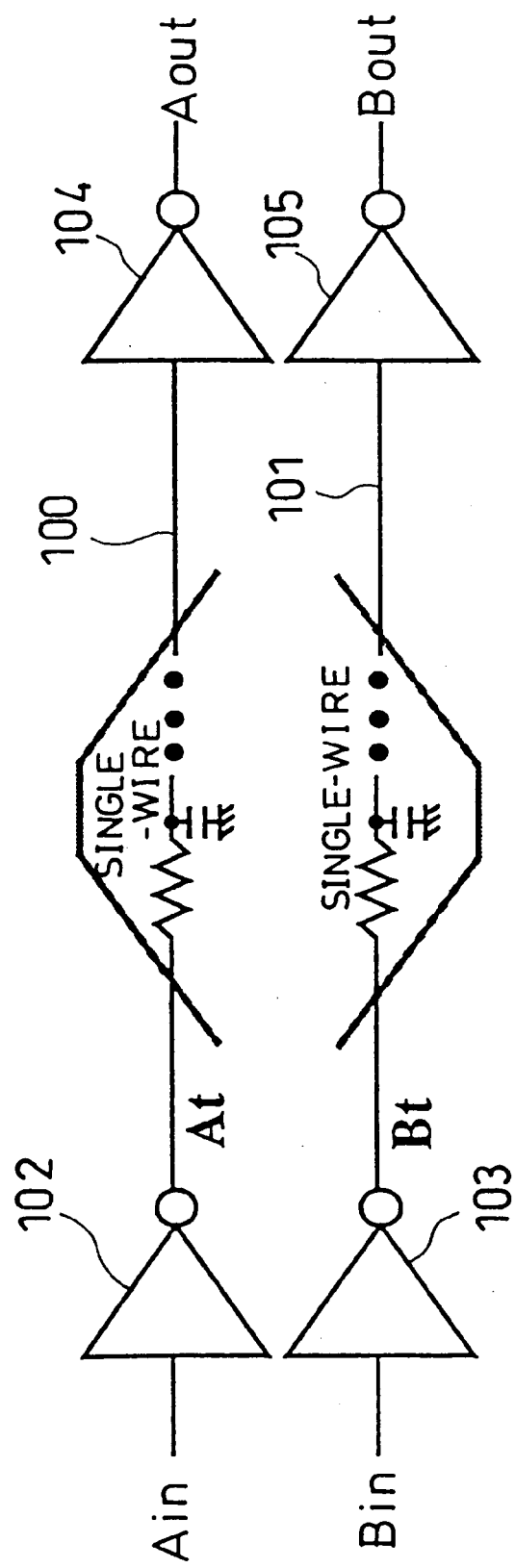
FIG. 24 is a circuit diagram showing the conventional embodiment.
Figure 25:
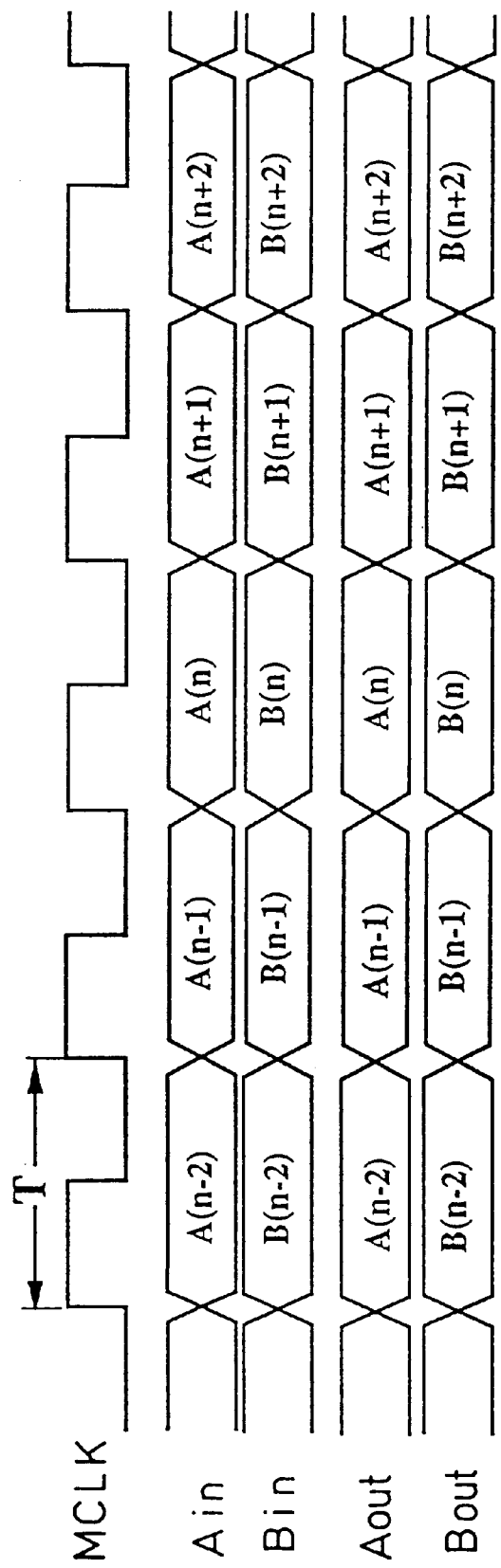
FIG. 25 is an operational timing chart of the conventional embodiment.

FIG. 23 shows the result of comparison between the third and fourth embodiments of the present invention and the conventional single-wire and differential systems. As can be seen from the drawing, the third and fourth embodiments can transfer data by consuming 13% and 1.6% of the power used in the conventional single-wire transmission method, respectively.

First Variation of Signal Generating Means

In the foregoing descriptions, the inverters 11 and 12 have been used as the signal generating means for generating the nonconcurrence signals which are not concurrent with the signals Ain, Bin to be transmitted so as to generate the inverted signals /Ain, /Bin of the respective signals Ain, Bin to be transmitted. In the present variation, however, delay elements are provided so as to generate delay signals by delaying in time the signals to be transmitted.

Figure 28:
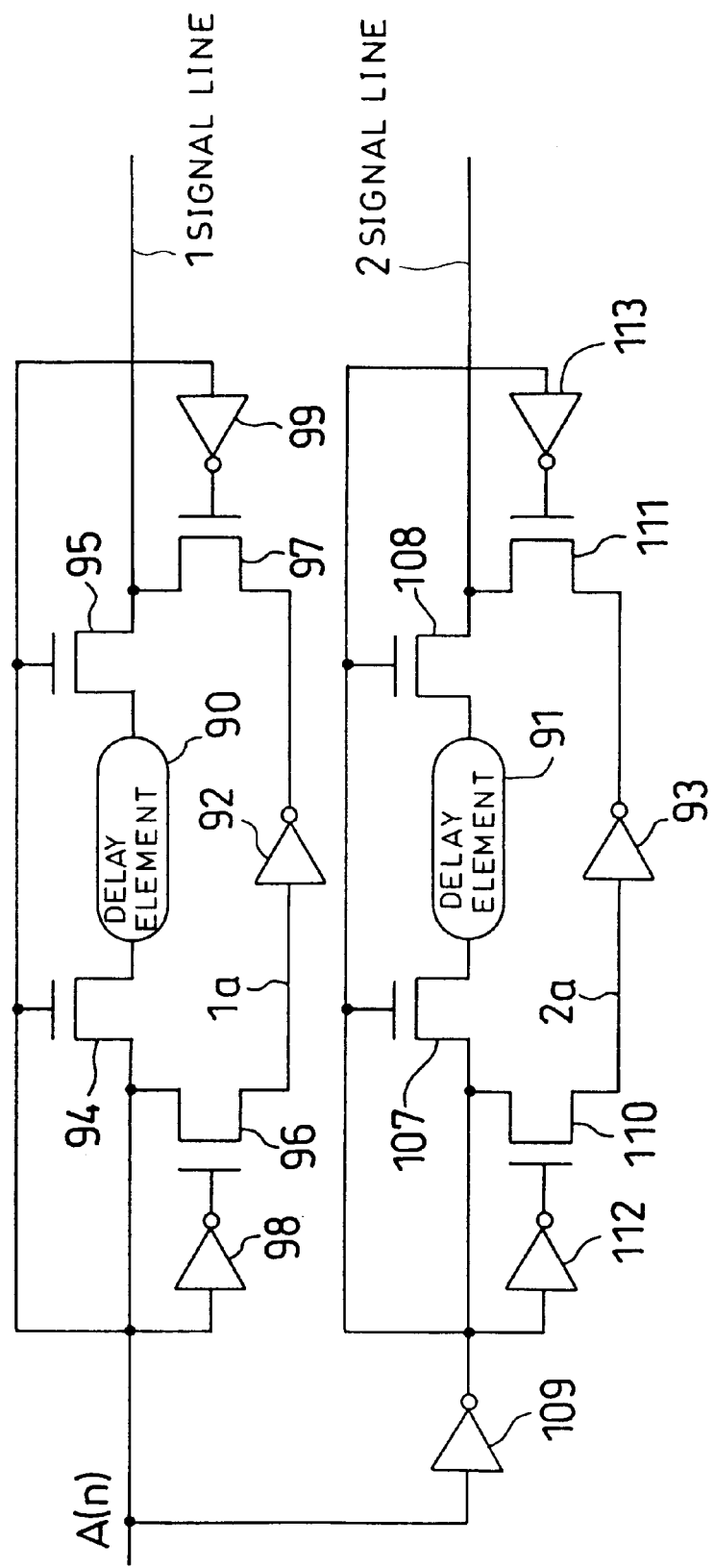
FIG. 28 is a circuit diagram showing a first variation of a signal generating circuit.
Figure 29:
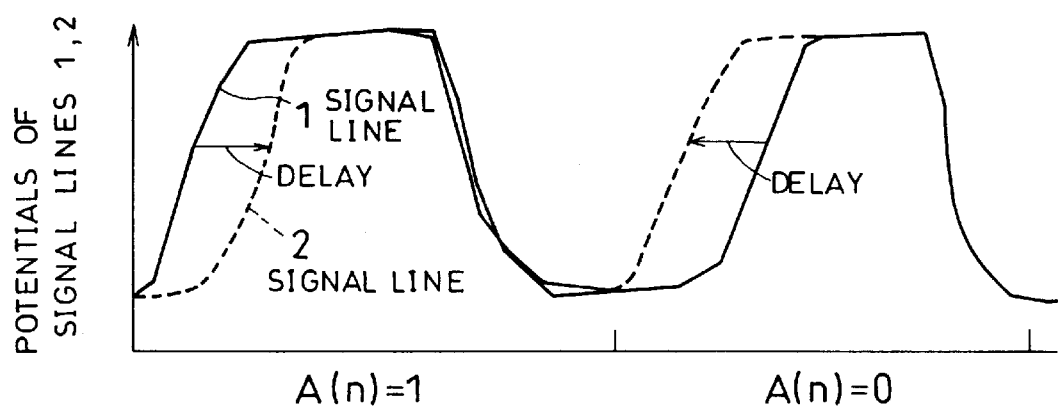
FIG. 29 is a view illustrating the operation of the first variation of the signal generating circuit.

FIG. 28 shows the signal generating means of the present variation. In the drawing, delay elements 90 and 91 are disposed in series in the signal lines 90 and 91, respectively, while other signal lines la and 2a passing through the above respective delay elements 90 and 91 are connected in parallel to the signal lines 1 and 2. In the above other signal lines 1a and 2a are disposed inverters 92 and 93, respectively. In the signal line 1, N-channel transistors 94 and 95 are turned ON when the signal A(n) to be transmitted is "1," thereby connecting the delay element 90 to the signal line 1. When the signal A(n) is "0," other N-channel transistors 96 and 97 are turned ON by the outputs from inverters 98 and 99, which were obtained by inverting the value of the signal A(n), thereby connecting the above inverter 92 to the signal line 1. In the signal 2, when the signal A(n) to be transmitted is "0," N-channel transistors 107 and 108 are turned ON by the output from an inverter 109, which was obtained by inverting the value of the signal A(n), thereby connecting the delay element 91 to the signal line 2. Other N-channel transistors 110 and 11 receive the outputs from other inverters 112 and 113 which invert the output from the above inverter 109 and are turned ON when the signal A(n) to be transmitted is "1," thereby connecting the inverter 93 to the signal line 2.

Thus, in the present variation, when the signal A(n) to be transmitted is "1, " it is transmitted through the delay element 90 along the signal line 1, while it is transmitted through the two inverters 109 and 93 along the signal line 2, so that the signal on the signal line 1 is delayed in time from the signal A(n) on the signal line 2. When the signal A(n) to be transmitted is "0," on the other hand, the signal A(n) is transmitted through the inverter 92 along the signal line 1, while the signal A(n) is transmitted through the inverter 109 and delay element 91 along the signal line 2, so that the signal on the signal line 2 is delayed in time from the signal /A(n) on the signal line 1.

Second Variation of Signal Generating Means

Figure 30:
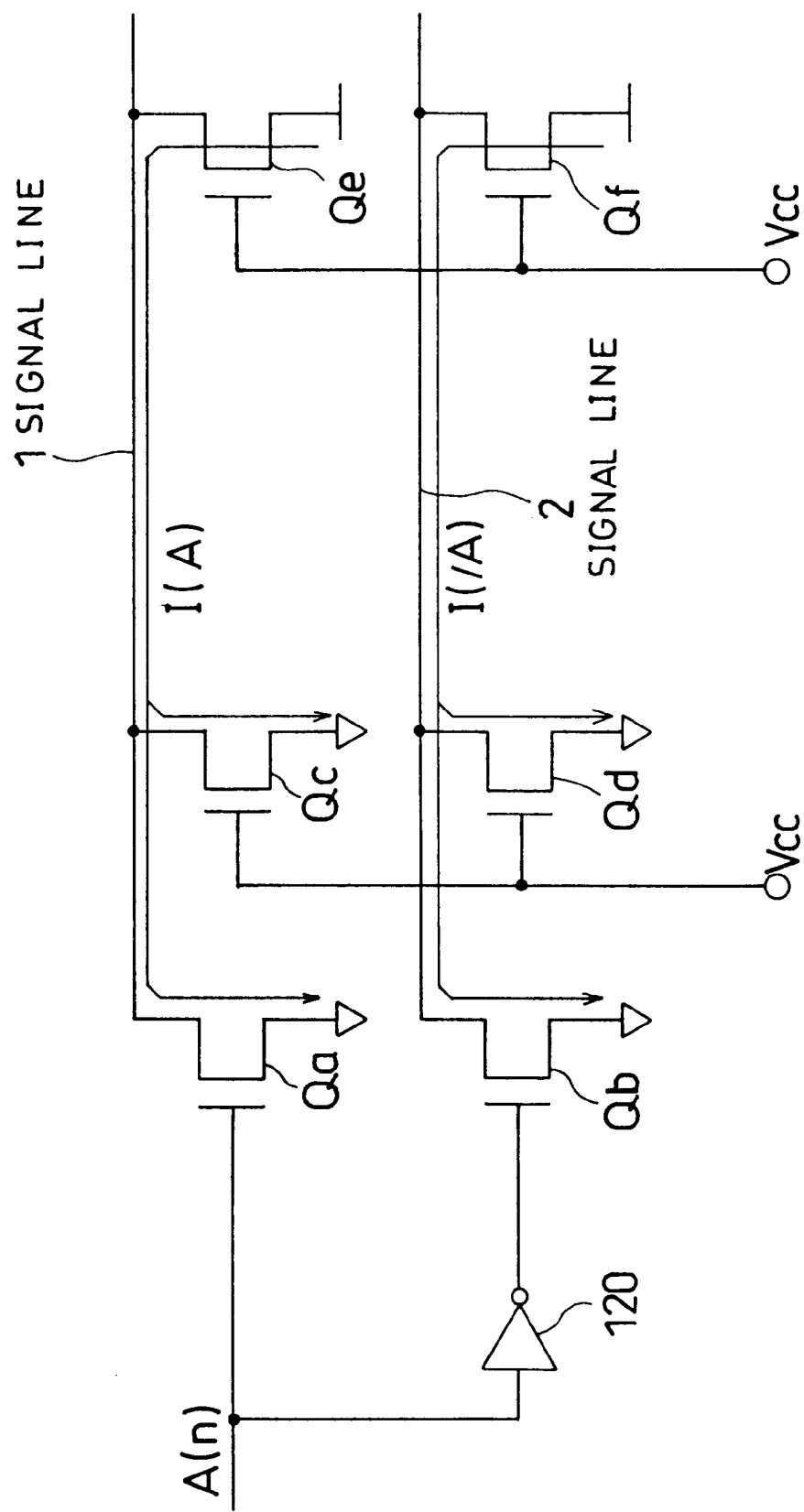
FIG. 30 is a circuit diagram showing a second variation of the signal generating circuit.

FIG. 30 shows a second variation of the signal generating circuit, in which is provided an impedance varying circuit for generating signals obtained by varying the amounts of currents of the signals to be transmitted.

Specifically, a current I(A) having an extremely small value is allowed to flow along the signal line 1 by N-channel transistors Qe and Qc which are constantly in the ON state. Similarly, a current I(/A) having an extremely small value is allowed to flow along the signal line 2 by N-channel transistors Qf and Qd which are constantly in the ON state. In the signal line 1, the N-channel transistor Qa is turned ON when the signal A(n) to be transmitted is "1," thereby connecting the signal line 1 to the ground. In the signal 2, when the signal A(n) to be transmitted is "0," the N-channel transistor Qb is turned ON by the signal /A(n) obtained by inverting the value of the signal A(n) by means of an inverter 120, thereby connecting the signal line 2 to the ground. The capacitances of the above transistors Qa and Qb are comparatively large, while the capacitances of the transistors Qc and Qd are comparatively small. The above transistors Qa and Qb constitute the impedance varying circuit for varying the respective impedances of the signal lines 1 and 2.

Figure 31:
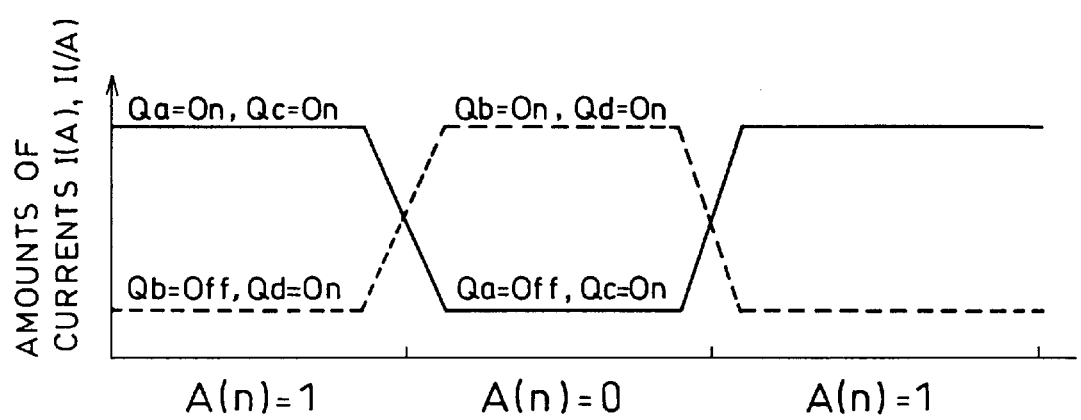
FIG. 31 is a view illustrating the operation of the second variation of the signal generating circuit.

As a result, when the signal A(n) to be transmitted is "1" in the present variation, the current I(/A) flowing along the signal line 2 has a small value, while the amount of the current I(A) flowing along the signal line 1 is increased accordingly since the transistor Qa is turned ON, as shown in FIG. 31. When the signal A(n) to be transmitted is "0, " on the other hand, the current I(A) flowing along the signal line 1 has a small value, while the amount of the current I(/A) flowing along the signal line 2 is increased accordingly since the transistor Qb is turned ON.

The signal generating circuit is not limited to the above variations. It is also possible to generate signals which are opposite to the signals to be transmitted in terms of the directions of potential changes or of the directions of currents.

Figure 32:
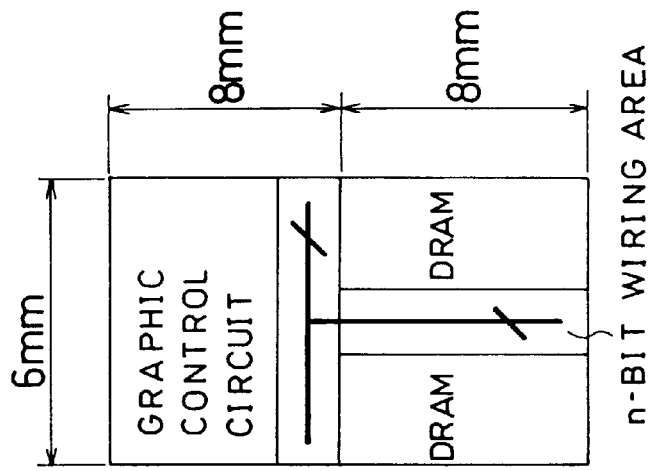
FIG. 32($a$) is a view showing an on-chip layout for evaluating the effectiveness of the present invention.
Figure 32:
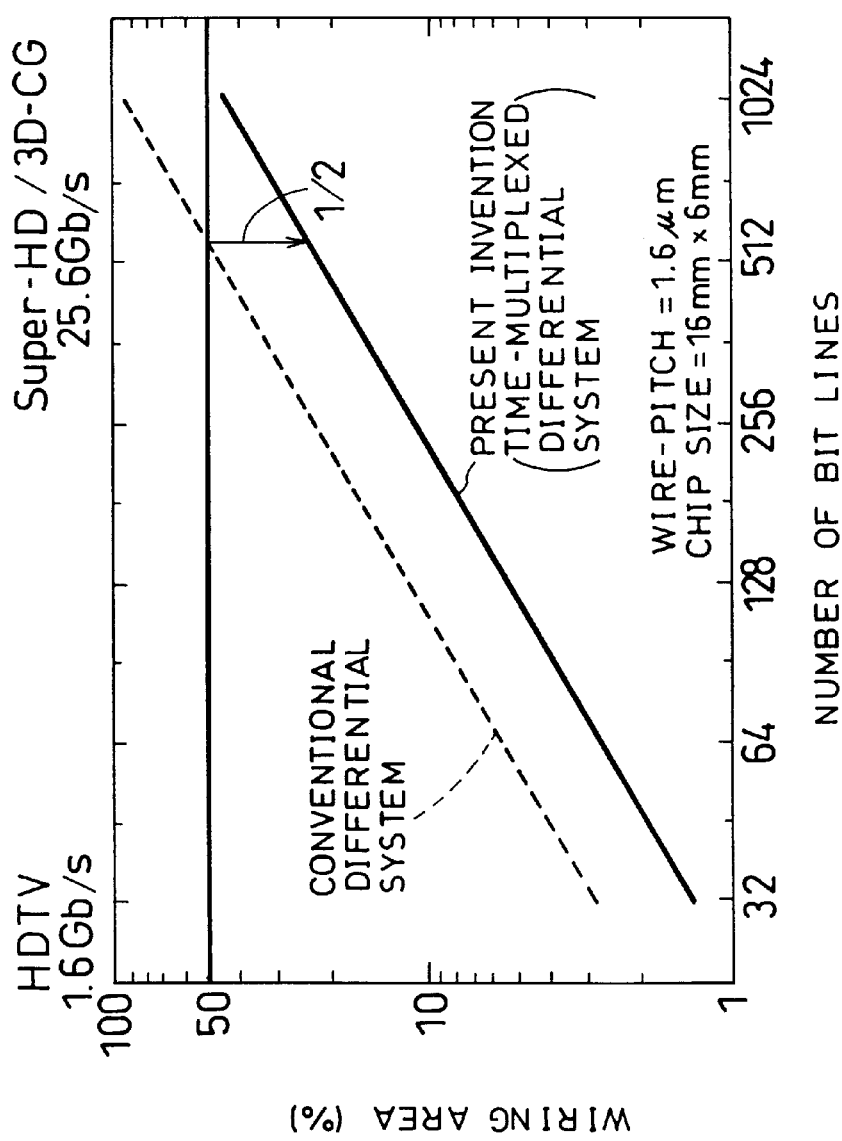

Next, a description will be given to an effect of the present invention. FIG. 32 shows the degree of contribution actually made by the present invention to a reduction in chip size. In the drawing, a chip area when a memory such as a DRAM and a graphic control circuit are integrated on one chip was calculated on the assumption that a wire-pitch was 1.6 $\mu$m.

To process an image of high quality on a high-definition TV (HDTV) level, a rate of data transfer between the memory and the graphic control circuit should be on the order of 1 Gbps. To process a three-dimensional image or an image by super high-definition TV, a rate of data transfer should be on the order of 25 Gbps. To obtain these transfer rates, if the frequency of data transfer is 50 MHz, a technique of transferring 512-bit data in parallel becomes necessary. Specifically, to reduce power consumption to 500 mw or lower, transmission with a small amplitude is required, so that differential transmission using a pair of signal lines, instead of single-wire transmission, is considered to be necessary. Hence, the number of signal lines required becomes 1024, which is double the number of signals to be transmitted. On the other hand, since data transfer requires different wires for reading data and for writing data, the total of 2048 wires are required by one chip. If it is assumed that the wire-pitch is 1.6 $\mu$m, when the chip area is 96 square meters, as shown in FIG. 32(a), 50% of the chip area will be the wiring area in which the above 2048 wires are installed. As a result, it would be impossible to lay out the memory and the graphic control circuit in the remaining 50% chip area.

By contrast, since the present invention assumedly performs time-multiplexed differential transmission, the number of wires required in the present invention is as small as 1024, which is half the number of wires required by the above technique. Accordingly, the ratio of the wiring area to the entire chip can be reduced to about 25%, as shown in FIG. 32(b), so that it becomes possible to lay out the memory, graphic control circuit, and the like on one chip having the area of 96 square meters.

We claim:

1. A signal transmitting circuit for transmitting first and second signals to be transmitted by means of first and second signal lines, said signal transmitting circuit comprising:

a first differential signal generating means for receiving the first signal and generating third and fourth signals forming a first differential signal based on the received first signal;

a second differential signal generating means for receiving the second signal and generating fifth and sixth signals forming a second differential signal based on the received second signal; and selecting means for receiving said first and second differential signals generated by said first and second differential signal generating means, and selecting one of said first differential signal and said second differential signal, and transmitting the two signals forming the selected differential signal to said first and second signal lines, respectively.

2. A signal transmitting circuit according to claim 1, wherein the selecting means alternately selects said first differential signal and said second differential signal.

3. A signal transmitting circuit according to claim 1, wherein said first differential signal generating means includes an inverter for inverting the third signal to generate the fourth signal, and said second differential signal generating means includes another inverter for inverting the fifth signal to generate the sixth signal.

4. A signal transmitting circuit according to claim 1, wherein the first differential signal generating means includes a circuit for delaying in time the third signal to generate the fourth signal, and the second differential signal generating means includes another circuit for delaying in time the fifth signal to generate the sixth signal.

5. A signal transmitting circuit according to claim 4, wherein the first differential signal generating means includes a delay element disposed in series in either of the first and second signal lines, for generating the fourth signal, and the second differential signal generating means includes another delay element disposed in series in either of the first and second signal lines, for generating the sixth signal.

6. A signal transmitting circuit according to claim 1, wherein the first differential signal generating means includes a circuit for varying a current amount of the third signal to generate the fourth signal, and the second differential signal generating means includes another circuit for varying a current amount of the fifth signal to generate the sixth signal.

7. A signal transmitting circuit according to claim 6, wherein the first differential signal generating means includes an impedance varying circuit for varying an impedance of either of the first and second signal lines to generate the fourth signal, and the second differential signal generating means includes another impedance varying circuit for varying an impedance of either of the first and second signal lines to generate the sixth signal.

8. A signal transmitting circuit according to claim 1, further comprising a voltage control means positioned between the selecting means and the first and second signal lines, wherein said voltage control means controls respective potentials of the two signals composing the differential signal outputted from said selecting means such that an amplitude voltage of the first signal line and an amplitude voltage of the second signal line are reduced to have values lower than a power-source voltage.

9. A signal transmitting circuit according to claim 8, further comprising:

signal receiving circuits positioned at respective rear ends of the first and second signal lines, wherein said signal receiving circuits receive the differential signals formed of the respective signals transmitted to the first and second signal lines and convert each of the received differential signals so as to have a potential difference between the power-source voltage and the ground voltage.

10. A signal transmitting circuit according to claim 1, wherein the selecting means consists of a first selecting means connected to the first signal line and a second selecting means connected to the second signal line, said first selecting means selecting either one of the third and sixth signals, said second selecting means selecting either one of the fourth and fifth signals.

11. A signal transmitting circuit according to claim 10, wherein the first selecting means alternately selects the third and sixth signals, and the second selecting means alternately selects the fourth and fifth signals.

12. A signal transmitting circuit according to claim 1, wherein the selecting means consists of a first selecting means connected to the first signal line and a second selecting means connected to the second signal line, said first selecting means selecting either one of the third and fifth signals, and said second selecting means selecting either one of the fourth and sixth signals.

13. A signal transmitting circuit according to claim 12, wherein the first selecting means alternately selects the third and fifth signals, and the second selecting means alternately selects the fourth and sixth signals.

14. A signal transmitting circuit according to claim 12, further comprising a change-over means positioned between the first and second selecting means and the first and second signal lines, wherein said change-over means switches a destination of an output from the first selecting means to the first signal line or to the second signal line and switches a destination of an output from the second selecting means to the second signal line or to the first signal line.

15. A signal transmitting circuit according to claim 1, further comprising:

storing means provided in two lines connected to said selecting means, and being in one of a single stage and multiple stages, subsequent to the selecting means, wherein when said storing means is in a single stage and multiple stages, two storing elements composing a first stage of said storing means store the differential signal composed of the two signals outputted from the selecting means; and when said storing means is in multiple stages, two corresponding storing elements in each stage except said first stage store the differential signal composed of the two signals outputted from two respective storing elements in a previous stage, and two final storing elements in a final stage output the two signals forming the differential signal stored therein to the first and second signal lines, respectively.

16. A signal transmitting circuit according to claim 8, wherein the voltage control means consists of:

a first driver of 1-input/1-output type for receiving either one of the two signals forming the differential signal outputted from the selecting means, and a second driver of 1-input/1-output type for receiving the other signal outputted from said selecting means, said first driver being connected to the first signal line, said second driver being connected to the second signal line.

17. A signal transmitting circuit according to claim 8, wherein the voltage control means consists of first and second drivers each of which is of differential-input/ differential-output type, said first and second drivers receiving the differential signal composed of the two signals outputted from the selecting means, said first and second drivers being connected to the first and second signal lines.

18. A signal transmitting circuit according to claim 9, wherein the signal receiving circuit consists of first and second receivers each of which is of differential-input/ differential-output type and connected to each of the first and second signal lines, either one of said first and second receivers receiving the differential signal from said first and second signal lines.

19. A signal transmitting circuit according to claim 18, wherein the first and second receivers alternately receive the differential signal from the first and second signal lines.

20. A signal transmitting circuit according to claim 1, wherein in one of the first and second signal lines is disposed in series a delay element having a delay time of about one half of a period of a wave form of the signal transmitted on one of the first and second signal lines.

21. A signal transmitting circuit according to claim 1, further comprising:

a switching means positioned between the selecting means and the first and second signal lines and opened during a time interval between transmission of the differential signal and initiation of subsequent transmission of the differential signal; and a precharging means for precharging said first and second signal lines to the same potential during the time interval during which said switching means is open.

22. A signal transmitting circuit according to claim 21, further comprising:

a transition detecting means and a control means, and a control means, wherein said transition detecting means receives the first and second signals to be transmitted, judging whether or not contents of the two signals coincide with each other, and outputs a transition detection signal when there is no coincidence therebetween or outputs a coincidence detection signal when there is a coincidence therebetween, and said control means enables, upon receiving the transition detection signal from said transition detecting means, the precharging means to precharge the first and second signal lines or inhibits, upon receiving the coincidence detection signal from said transition detecting means, the precharging means from precharging the first and second signal lines.

23. A signal transmitted circuit for transmitting a plurality of signals to be transmitted by means of signal lines which are equal in number to the signals, wherein said plurality of signal lines are grouped in pairs and each pair comprises:

first and second signal lines through which first and second signals among the plurality of signals to be transmitted are transmitted, respectively;

a first differential signal generating means for receiving the first signal and generating third and fourth signals forming a first differential signal based on the received first signal;

a second differential signal generating means for receiving the second signal and generating fifth and sixth signals forming a second differential signal based on the received second signal; and a selecting means for receiving said first and second differential signals generated by said first and second differential signal generating means, selecting either said first differential signal said second differential signal, and transmitting the two signals forming the selected differential signal to said first and second signal lines, respectively.

24. A signal transmitting circuit according to claim 23, wherein the first differential signal generating means in each pair includes a circuit for delaying in time the third signal to generate the fourth signal, and the second differential signal generating means in each pair includes another circuit for delaying in time the fifth signal to generate the sixth signal.

25. A signal transmitting circuit according to claim 24, wherein the first differential signal generating means in each pair includes a delay element disposed in series in either of the first and second signal lines, for generating the fourth signal, and the second differential signal generating means includes another delay element disposed in series in either of the first and second signal lines, for generating the sixth signal.

26. A signal transmitted circuit according to claim 23, wherein the first differential signal generating means in each pair includes a circuit for varying a current amount of the third signal to generate the fourth signal, and the second differential signal generating means in each pair includes another circuit for varying a current amount of the fifth signal to generate the sixth signal.

27. A signal transmitting circuit according to claim 26, wherein the first differential signal generating means in each pair includes an impedance varying circuit for varying an impedance of either of the first and second signal lines to generate the fourth signal, and the second differential signal generating means in each pair includes another impedance varying circuit for varying an impedance of either of the first and second signal lines to generate the sixth signal.

28. A signal transmitting circuit for transmitting a plurality of signals to be transmitted by means of signal lines which are equal in number to the signals, wherein said plurality of signal lines are grouped in pairs and each pair comprises:

first and second signal lines through which first and second signals among the plurality of signals to be transmitted are transmitted, respectively:

a first differential signal generating means for receiving the first signal and generating third and fourth signals forming a first differential signal based on the received first signal;

a second differential signal generating means for receiving the second signal and generating fifth and sixth signals forming a second differential signal based on the received second signal;

a selecting means for receiving said first and second differential signals generated by said first and second signal generating means, selecting either said first differential signal or said second differential signal, and transmitting the two signals forming the selected differential signal to said first and second signal lines, respectively: and a voltage control means positioned between said selecting means and the first and second signal lines, wherein said voltage control means has a first supply terminal which is supplied with a first potential and a second supply terminal which is supplied with a second potential, receives the two signals composing the differential signal from said selecting means, converts one of the two received signals to a signal having said first potential and the other of the two received signals to a signal having said second potential, and then outputs the two signals to the first and second signal lines, said voltage control means in each pair is disposed in series between a first power source and a second power source having a voltage lower than a voltage of the first power source, the first supply terminal of the voltage control means in an uppermost stage is connected to said first power source, the second supply terminal of the voltage control means in a lowermost stage is connected to said second power source, and each of the voltage control means other than said respective voltage control means in the uppermost and lowermost stages has its first supply terminal connected to the second supply terminal of the voltage control means positioned in its upper stage and has its second supply terminal connected to the first supply terminal of the voltage control means positioned in its lower stage.

29. A signal transmitting circuit according to claim 28, wherein the selecting means in each pair alternately selects said first differential signal and said second differential signal.

30. A signal transmitting circuit according to claim 28, wherein the first differential signal generating means in each pair includes a circuit for delaying in time the third signal to generate the fourth signal, and the second differential signal generating means in each pair includes another circuit for delaying in time the fifth signal to generate the sixth signal.

31. A signal transmitting circuit according to claim 28, wherein the first differential signal generating means in each pair includes a delay element disposed in series in either of the first and second signal lines, for generating the fourth signal, and the second differential signal generating means in each pair includes another delay element disposed in series in either of the first and second signal lines, for generating the sixth signal.

32. A signal transmitting circuit according to claim 28, wherein the first differential signal generating means in each pair includes a circuit for varying a current amount of the third signal to generate the fourth signal, and the second differential signal generating means in each pair includes another circuit for varying a current amount of the fifth signal to generate the sixth signal.

33. A signal transmitting circuit according to claim 32, wherein the first differential signal generating means in each pair includes an impedance varying circuit for varying an impedance of either of the first and second signal lines to generate the fourth signal, and the second differential signal generating means in each pair includes another impedance varying circuit for varying an impedance of either of the first and second signal lines to generate the sixth signal.

34. A signal transmitting circuit according to claim 28, wherein the voltage control means having the first supply terminal which is supplied with a voltage equal to or more than ½ of the voltage of the first power source is composed of a P-type MOSFET.

35. A signal transmitting circuit according to claim 28, wherein the voltage control means having the first supply terminal which is supplied with a voltage less than ½ of the voltage of the first power source is composed of an N-type MOSFET.

36. A signal transmitting circuit according to claim 28, wherein a potential difference between the first power source and the second power source is an integral multiple of a potential difference between said first and second signal lines in each pair.

37. A signal transmitting method of transmitting first and second signals to be transmitted by means of first and second signal lines, said signal transmitting method comprising the steps of:

receiving said first and second signals;

generating third and fourth signals forming a first differential signal based on the received first signal and transmitting the third and fourth signals forming the first differential signal to said first and second signal lines, respectively; and generating fifth and sixth signals forming a second differential signal based on the received second signal and transmitting the fifth and sixth signals forming the second differential signal to said first and second signal lines, respectively.

38. A signal transmitting method according to claim 37, wherein the step of receiving the first signal and generating and transmitting the third and fourth signals forming the first differential signal is repeated a plurality of times and the step of receiving the second signal and generating and transmitting the fifth and sixth signals forming the second differential signal is also repeated a plurality of times.

39. A signal transmitting method according to claim 37, wherein the step of receiving the first signal and generating and transmitting the third and fourth signals forming the first differential signal is performed once, and the step of receiving the second signal and generating and transmitting the fifth and sixth signals forming the second differential signal is repeated a plurality of times.

40. A signal transmitting method according to claim 37, wherein the step of receiving the first signal and generating and transmitting the third and fourth signals forming the first differential signal is performed once, and the step of receiving the second signal and generating and transmitting the fifth and sixth signals forming the second differential signal is also performed once.

41. A signal transmitting method according to claim 37, wherein the fourth and sixth signals are complementary to the third and fifth signals, respectively.

42. A signal transmitting method according to claim 37, wherein the fourth and sixth signals are obtained by delaying in time the third and fifth signals, respectively.

43. A signal transmitting method according to claim 37, wherein the fourth and sixth signals are obtained by varying amounts of currents of the third and fifth signals to be transmitted, respectively.

44. A signal transmitted method according to claim 40, wherein the third signal and the fourth signal thereof are transmitted in an early half of one period of a clock, and the fifth signal and the sixth signal thereof are transmitted in a late half of one period of said clock.

45. A signal transmitting method according to claim 37, wherein in transmitting the signals to the first and second signal lines, the signals to be transmitted to the first and second signal lines are converted, depending on respective potentials of the signals, to a first potential and a second potential having a potential difference lower than a power-source voltage between said first potential and itself and then transmitted to the first and second signal lines.

46. A signal transmitting method of transmitting first and second signals to be transmitted by means of first and second signal lines, said signal transmitting method comprising the steps of:

receiving said first and second signals;

precharging said first and second signal lines to the same potential;

generating third and fourth signals forming a first differential signal based on the received first signal and transmitting the third and fourth signals forming the first differential signal to said first and second signal lines, respectively;

precharging said first and second signal lines to the same potential; and generating fifth and sixth signals forming a second differential signal based on the received second signal and transmitting the fifth and sixth signals forming the second differential signal to said first and second signal lines respectively.

47. A signal transmitting method according to claim 46, wherein the step of precharging the first and second signal lines and the step of generating and transmitting the third and fourth signals make a first set of steps and the first set of step is repeated a plurality of times, and the step of precharging the first and second signal lines and the step of generating and transmitting the fifth and sixth signals make a second set of steps and the second set of steps is repeated a plurality to times after the first set of steps is repeated a plurality of times.

48. A signal transmitting method according to claim 46, wherein the step of precharging the first and second signal lines and the step of generating and transmitting the third and fourth signals make a first set of steps and the first set of steps is performed once, and the step of precharging the first and second signal lines and the step of generating and transmitting the fifth and sixth signals make a second set of steps and the second set of steps is repeated a plurality of times after the first set of steps is performed once.

49. A signal transmitting method according to claim 46, wherein the step of precharging the first and second signal lines and the step of generating and transmitting the third and fourth signals make a first set of steps and the first set of steps is performed once, and the step of precharging the first and second signal lines and the step of generating and transmitting the fifth and sixth signals make a second set of steps and the second set of steps is performed once.

50. A signal transmitting method according to claim 46, wherein the fourth and sixth signals are complementary to the third and fifth signals, respectively.

51. A signal transmitting method according to claim 46, wherein the fourth and sixth signals are obtained by delaying in time the third and fifth signals, respectively.

52. A signal transmitting method according to claim 46, wherein the fourth and sixth signals are obtained by varying amounts of currents of the third and fifth signals, respectively.

53. A signal transmitting method according to claim 49, wherein first precharging of the first and second signal lines is performed in an early half of an early half-period of a clock, transmission of the third signal and the fourth signal is performed in a late half of the early half-period of said clock, subsequent precharging of the first and second signal lines is performed in an early half of a late half-period of the clock, and transmission of the fifth signal and the sixth signal is performed in a late half of the late half-period of said clock.

54. A signal transmitting method according to claim 46, wherein in transmitting the signals to the first and second signal lines, the signals to be transmitted to the first and second signal lines are converted, depending on respective potentials of the signals, to a first potential and a second potential having a potential difference lower than a power-source voltage between said first potential and itself and then transmitted to the first and second signal lines.

55. A signal transmitting method according to claim 46, wherein it is judged whether or not respective contents of the received first and second signals coincide with each other, and when there is a coincidence therebetween, precharging of the first and second signal lines after transmitting the third signal and the fourth signal is not performed.

56. A signal transmitting method of transmitting a plurality of signals to be transmitted by means of signal lines which are equal in number to the signals, wherein said plurality of signal lines are grouped in pairs and each pair performs the steps of:

receiving first and second signals to be transmitted; generating third and fourth signals forming a first differential signal based on the received first signal and transmitting the third and fourth signals forming the first differential signal to the two signal lines, respectively in the pair thereof;

generating fifth and sixth signals forming a second differential signal based on the received second signal and transmitting the fifth and sixth signals forming the second differential signal to said two signal lines, respectively, and connecting, in every specified two pairs of said plurality of pairs, the signal line having a decreasing potential belonging to one of the pairs to the signal line having an increasing potential belonging to the other of the pairs, said signal line having the increasing potential reusing charges of said signal line having the decreasing potential.

57. A signal transmitting method according to claim 56, wherein the fourth and sixth signals are complementary to the third and fifth signals, respectively.

58. A signal transmitting method according to claim 56, wherein the fourth and sixth signals are obtained by delaying in time the third and fifth signals, respectively.

59. A signal transmitting method according to claim 56, wherein the fourth and sixth signals are obtained by varying amounts of currents of the third and fifth signals, respectively.

* * * * *